US009516272B2

(12) United States Patent
Avni et al.

(10) Patent No.: US 9,516,272 B2
(45) Date of Patent: *Dec. 6, 2016

(54) ADAPTING A CONTINUOUS PRESENCE LAYOUT TO A DISCUSSION SITUATION

(71) Applicant: Polycom, Inc., San Jose, CA (US)

(72) Inventors: Uri Avni, Moshav Ram-On (IL); Eyal Leviav, Tel Aviv (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,506

(22) Filed: Aug. 19, 2014

(65) Prior Publication Data

US 2014/0354764 A1   Dec. 4, 2014

Related U.S. Application Data

(63) Continuation-in-part of application No. 14/014,146, filed on Aug. 29, 2013, now Pat. No. 9,041,767, which is a continuation of application No. 12/750,851, filed on Mar. 31, 2010, now Pat. No. 8,542,266.

(60) Provisional application No. 61/868,646, filed on Aug. 22, 2013.

(51) Int. Cl.
*H04N 7/15* (2006.01)
*G06T 11/60* (2006.01)

(52) U.S. Cl.
CPC ............. *H04N 7/152* (2013.01); *G06T 11/60* (2013.01); *H04N 7/15* (2013.01)

(58) Field of Classification Search
CPC ............ H04N 7/15; H04N 7/152; G06T 11/60
USPC ...... 345/178; 348/14.01, 14.07, 14.08, 14.09, 348/14.02, 14.03; 370/265
See application file for complete search history.

(56) References Cited

U.S. PATENT DOCUMENTS

| 5,990,933 | A | 11/1999 | Ozone et al. | |
|---|---|---|---|---|
| 6,300,973 | B1 | 10/2001 | Feder et al. | |
| 6,744,460 | B1 | 6/2004 | Nimri et al. | |
| 6,956,600 | B1 * | 10/2005 | Gaylord | H04N 7/15 348/14.08 |
| 7,034,860 | B2 * | 4/2006 | Lia | H04N 7/147 348/14.07 |
| 7,174,365 | B1 | 2/2007 | Even et al. | |
| 7,321,384 | B1 * | 1/2008 | Wu | H04N 7/152 348/14.08 |
| 7,492,387 | B2 | 2/2009 | Yang et al. | |
| 7,542,068 | B2 | 6/2009 | Eshkoli et al. | |

(Continued)

FOREIGN PATENT DOCUMENTS

| CN | 101478642 | 7/2009 |
|---|---|---|
| JP | 2003339037 | 11/2003 |
| WO | 0215556 | 2/2002 |

*Primary Examiner* — Gerald Gauthier
(74) *Attorney, Agent, or Firm* — Blank Rome, LLP

(57) ABSTRACT

A system and method is disclosed for adapting a continuous presence videoconferencing layout according to interactions between conferees. Using regions of interest found in video images, the arrangement of images of conferees may be dynamically arranged as displayed by endpoints. Arrangements may be responsive to various metrics, including the position of conferees in a room and dominant conferees in the videoconference. Video images may be manipulated as part of the arrangement, including cropping and mirroring the video image. As interactions between conferees change, the layout may be automatically rearranged responsive to the changed interactions.

29 Claims, 8 Drawing Sheets

(56) References Cited

U.S. PATENT DOCUMENTS

| | | |
|---|---|---|
| 7,612,793 B2 | 11/2009 | Potekhin et al. |
| 7,800,642 B2 | 9/2010 | Eshkoli et al. |
| 7,924,305 B2 | 4/2011 | Thielman et al. |
| 7,940,294 B2 | 5/2011 | Wu et al. |
| 7,990,410 B2 | 8/2011 | Mock et al. |
| 8,085,290 B2 | 12/2011 | Graham et al. |
| 8,120,638 B2 * | 2/2012 | Kenoyer ............ H04N 7/15 348/14.07 |
| 8,125,508 B2 * | 2/2012 | Kenoyer ............ H04L 29/06027 348/14.08 |
| 8,125,509 B2 * | 2/2012 | Kenoyer ............ H04N 7/147 348/14.08 |
| 8,139,100 B2 * | 3/2012 | King ............ H04N 7/152 348/14.08 |
| 8,144,186 B2 | 3/2012 | Wagner |
| 8,228,363 B2 | 7/2012 | Halavy |
| 8,259,624 B2 * | 9/2012 | Schirdewahn ........ H04N 7/152 348/14.08 |
| 8,264,519 B2 | 9/2012 | Lunde et al. |
| 8,289,371 B2 | 10/2012 | Wagner et al. |
| 8,310,520 B2 * | 11/2012 | Gopal ............ H04L 12/1881 348/14.01 |
| 8,319,814 B2 * | 11/2012 | King ............ H04N 7/152 348/14.01 |
| 8,339,440 B2 * | 12/2012 | Wang ............ H04L 12/1818 348/14.08 |
| 8,395,650 B2 | 3/2013 | Graham et al. |
| 8,446,454 B2 | 5/2013 | Decker et al. |
| 8,487,976 B2 * | 7/2013 | Kenoyer ............ H04N 7/15 348/14.08 |
| 8,514,265 B2 * | 8/2013 | Goyal ............ H04N 7/147 348/14.09 |
| 8,704,871 B2 * | 4/2014 | Eisenberg ............ H04N 7/152 348/14.09 |
| 8,760,492 B2 | 6/2014 | Halavy et al. |
| 8,970,657 B2 * | 3/2015 | Rosenberg ............ H04N 7/147 348/14.01 |
| 9,041,767 B2 * | 5/2015 | Leviav ............ H04N 7/152 345/535 |
| 2002/0188731 A1 | 12/2002 | Potekhin et al. |
| 2003/0149724 A1 | 8/2003 | Chang |
| 2005/0195275 A1 | 9/2005 | Lia et al. |
| 2005/0254440 A1 | 11/2005 | Sorrell |
| 2007/0064094 A1 | 3/2007 | Potekhin et al. |
| 2007/0165106 A1 | 7/2007 | Groves et al. |
| 2007/0206089 A1 * | 9/2007 | Eshkoli ............ H04L 12/1822 348/14.02 |
| 2007/0273754 A1 | 11/2007 | Cockerton et al. |
| 2007/0285505 A1 * | 12/2007 | Korneliussen ........ H04N 7/147 348/14.08 |
| 2008/0043090 A1 | 2/2008 | Wiener |
| 2008/0246834 A1 | 10/2008 | Lunde et al. |
| 2008/0266379 A1 | 10/2008 | Hubenthal et al. |
| 2008/0291265 A1 | 11/2008 | Wagner et al. |
| 2009/0015661 A1 * | 1/2009 | King ............ H04N 7/152 348/14.09 |
| 2009/0207844 A1 | 8/2009 | Gaylord |
| 2010/0073454 A1 * | 3/2010 | Lovhaugen ............ G06F 3/0486 348/14.03 |
| 2010/0134589 A1 | 6/2010 | Zhang et al. |
| 2010/0231556 A1 * | 9/2010 | Mines ............ H04N 7/15 345/178 |
| 2011/0090302 A1 | 4/2011 | Leviav et al. |
| 2012/0147130 A1 | 6/2012 | Wagner |
| 2012/0176467 A1 | 7/2012 | Kenoyer |
| 2014/0354764 A1 * | 12/2014 | Avni ............ H04N 7/152 348/14.07 |

* cited by examiner

US 9,516,272 B2

ADAPTING A CONTINUOUS PRESENCE LAYOUT TO A DISCUSSION SITUATION

TECHNICAL FIELD

The present invention relates to the field of communication, and in particular to methods and systems for video conferencing.

BACKGROUND ART

Videoconferencing enables individuals located at different locations to have face-to-face meetings on short notice using audio and video telecommunications. A videoconference may involve as few as two sites (point-to-point) or several sites (multi-point). A single participant may be located at a conferencing site, or there may be several participants at a site, such as at a conference room. Videoconferencing may also be used to share documents, information, and the like.

Participants in a videoconference interact with participants at other sites via a videoconferencing endpoint. An endpoint is a terminal on a network, capable of providing real-time, two-way audio/visual/data communication with other endpoints or with a multipoint control unit (MCU). An endpoint may provide speech only, speech and video, or speech, data and video communications, etc. A videoconferencing endpoint typically comprises a display unit on which video images from one or more remote sites may be displayed. Example endpoints include POLYCOM® VSX® and HDX® series, each available from Polycom, Inc. (POLYCOM, VSX, and HDX are registered trademarks of Polycom, Inc.). The videoconferencing endpoint sends audio, video, and/or data from a local site toward a remote site(s) and displays video and/or data received from the remote site(s) on a screen.

Video images displayed on a screen at a videoconferencing endpoint may be arranged in a layout. The layout may include one or more segments for displaying video images. A segment is a portion of the screen of a receiving endpoint that is allocated to a video image received from one of the sites participating in the session. For example, in a videoconference between two participants, a segment may cover the entire display area of the screen of the local endpoint. Another example is a video conference between a local site and multiple other remote sites where the videoconference is conducted in switching mode, such that video from only one other remote site is displayed at the local site at a single time and the displayed remote site may be switched, depending on the dynamics of the conference. In contrast, in a continuous presence (CP) conference, a conferee at a terminal may simultaneously observe several other participants' sites in the conference. Each site may be displayed in a different segment of the layout, where each segment may be the same size or a different size. The choice of the sites displayed and associated with the segments of the layout may vary among different conferees that participate in the same session. In a CP layout, a received video image from a site may be scaled down or cropped in order to fit a segment size.

An MCU may be used to manage a videoconference. An MCU is a conference controlling entity that may be located in a node of a network, in a terminal, or elsewhere. The MCU may receive and process several media channels from access ports according to certain criteria and distributes these media channels to the connected channels via other ports. Examples of MCUs include the MGC-100 and RMX® 2000, available from Polycom Inc. (RMX 2000 is a registered trademark of Polycom, Inc.). Some MCUs are composed of two logical units: a media controller and a media processor. A more thorough definition of an endpoint and an MCU may be found in the International Telecommunication Union ("ITU") standards, such as but not limited to the H.320, H.324, and H.323 standards. Additional information regarding the ITU standards may be found at the ITU website www.itu.int.

To present a video image within a segment of a screen layout of a receiving endpoint (site), the entire received video image may be manipulated, scaled down and displayed, or a portion of the video image may be cropped by the MCU and displayed. An MCU may crop lines or columns from one or more edges of a received conferee video image in order to fit it to the area of a segment in the layout of the videoconferencing image. Another cropping technique may crop the edges of the received image according to a region of interest in the image, as disclosed in U.S. Pat. No. 8,289,371, the entire contents of which are incorporated herein by reference.

In a videoconferencing session, the size of a segment in a layout may be defined according to a layout selected for the session. For example, in a 2×2 layout each segment may be substantially a quarter of the display, as illustrated in FIG. 1. Layout 100 includes segments 112, 114, 116 and 118. In a 2×2 layout, if five sites are taking part in a session, conferees at each site typically may see the other four sites.

In a CP videoconferencing session, the association between sites and segments may be dynamically changed according to the activity taking part in the conference. In some layouts, one of the segments may be allocated to a current speaker, and other segments may be allocated to other sites, sites that were selected as presented conferees. The current speaker is typically selected according to certain criteria, such as the loudest speaker during a certain percentage of a monitoring period. The other sites (in the other segments) may include the previous speaker, sites with audio energy above the others, certain conferees required by management decisions to be visible, etc.

In the example illustrated in FIG. 1, only three quarters of the area of the display are Used—segments 112, 114, and 116—and the fourth quarter 118 is occupied by a background color. Such a situation may occur when only four sites are active and each site sees the other three. Furthermore, segment 116 displays an empty room, while the sites presented in segment 112 and 114 each include a single conferee (conferees 120 and 130). Consequently, during this period of the session only half of the screen area is effectively used and the other half is ineffectively used. The area of segments 116 and segment 118 do not contribute to the conferees' experience and therefore are not exploited in a smart and effective manner.

Furthermore, as may be seen in both segment 112 and 114, a major area of the image is redundant. The video images capture a large portion of the room while the conferees' images 120 and 130 are small and located in a small area. Thus, a significant portion of the display area is wasted on uninteresting areas. Consequently, the area that is captured by the conferees' images is affected and the experience of the conferees viewing the layout of the video conference is not optimal.

Moreover, in some conference sessions, one or more of the sites have a single participant, while in other sites there are two or more participants. In currently available layouts, each site receives similar segment sizes and as a result, each participant at a site with a plurality of conferees is displayed over a smaller area than a conferee in a site with fewer participants, degrading the experience of the viewer.

In some videoconferencing sessions, there may be sites with a plurality of conferees where only one of them is active and does the talking with the other sites. Usually the video camera in this room captures the entire room, with the plurality of conferees, allocating a small screen area to each one of the conferees including the active conferee. In other sessions content (data) may be presented as part of the layout, typically in one of the segments independently from the video images presented in the other segments.

If during a conference call one of the conferees steps far from the camera, that conferee's image will seem smaller and again the experience of the conferees viewing the layout of the video conference is degraded. Likewise, if the conferees at a displayed site leave the room for a certain time and return afterward, the empty room is displayed on the layout during the conferees' absence.

In some known techniques, the viewing conferees at the other sites may manually change the layout viewed at their endpoints to adjust to the dynamics of the conference, but this requires the conferees to stop what they are doing and deal with a layout menu to make such an adjustment.

SUMMARY OF INVENTION

A system and method is disclosed for adapting a continuous presence videoconferencing layout according to interactions between conferees. Using regions of interest found in video images, the arrangement of images of conferees may be dynamically arranged as displayed by endpoints. Arrangements may be responsive to various metrics, including the position of conferees in a room and dominant conferees in the videoconference. Video images may be manipulated as part of the arrangement, including cropping and mirroring the video image. As interactions between conferees change, the layout may be automatically rearranged responsive to the changed interactions.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
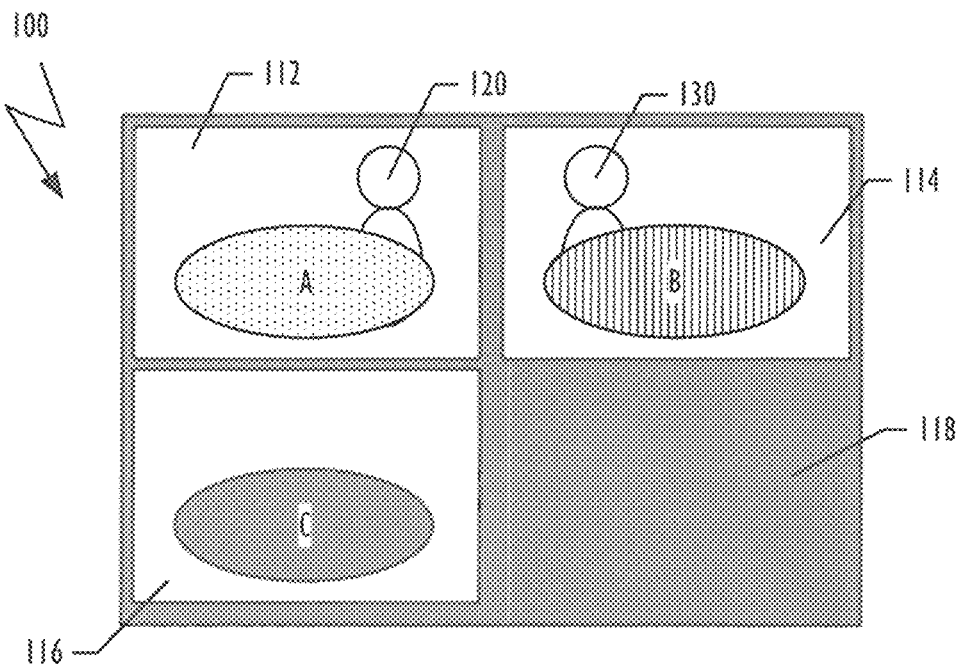
FIG. 1 illustrates an example prior art 2×2 layout displayed.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

Turning now to the figures in which like numerals represent like elements throughout the several views, embodiments, aspects and features of the disclosed systems and methods are described. For convenience, only some elements of the same group may be labeled with numerals. The purpose of the drawings is describe embodiments and not for production or limitation.

In the present disclosure, the words "unit," "device," "component," "module," and "logical module" may be used interchangeably. Anything designated as a unit or module may be a stand-alone module or a specialized or integrated module. A module may be modular or have modular aspects allowing it to be easily removed and replaced with another similar unit or module. Each module may be any one of, or any combination of, software, hardware, and/or firmware. Software of a logical module may be embodied on a computer readable medium such as a read/write hard disc, CDROM, Flash memory, ROM, etc. In order to execute a certain task a software program may be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

Current methods for arranging segments in a layout of a CP videoconferencing ignore the interaction between conferees that are located in different sites and the conferee viewing the layout. A conferee that looks at the example prior art CP layout 100 of FIG. 1 sees an unnatural view of a conference in which two conferees 120 and 130 are sitting back to back. The effect may be even worse when the two conferees are the dominant conferees in the session and most of the talking is done between them. Such a layout does not reflect a conference between peers.

Further, from time to time, during a conference session, a discussion may arise between two or more conferees. However, current videoconferencing systems are not aware of a discussion situation and do not adapt the audio mix and the CP layout to reflect the discussion situation. Consequently, the conferees that participate in the discussion may be presented in segments that are located far from each other. In addition the audio mix may include only one of those conferees as the current speaker.

The above-described deficiencies of handling interaction between conferees in videoconferencing, do not intend to limit the scope of the inventive concepts of the present disclosure in any manner. The disclosure is directed to a novel technique for adapting and arranging the layout, as well as the audio mix, according to the interaction between the presented conferees in the different sites may improve the experience of the viewer of the CP video image that is based on the layout. Adapting and arranging the layout according to the interaction between the different conferees at different sites may provide an experience similar to a real conference in which the conferees look at each other.

Figure 2:
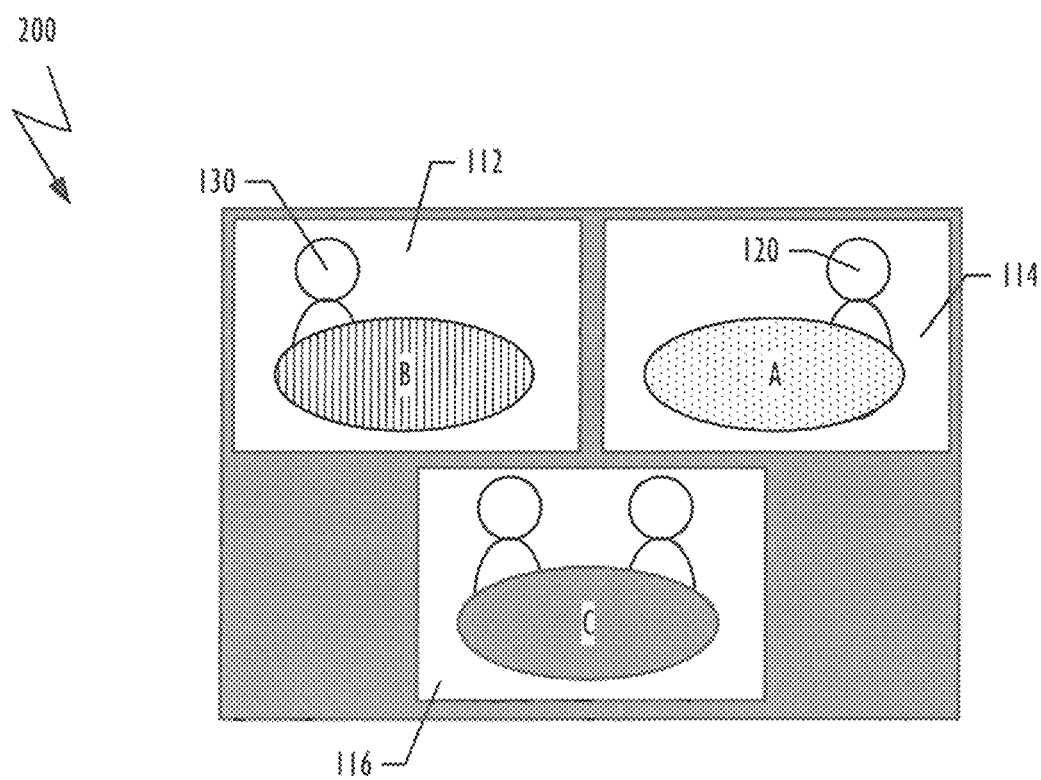
FIG. 2 illustrates an adapted layout according to interaction of participants in different sites, according to one embodiment.

FIG. 2 illustrates an example layout 200 of the same videoconferencing session as FIG. 1, wherein the positions of the video images coming from sites B and A have been exchanged in the layout 200 to give a more faithful sensation of the conference. Site B with conferee 130 is presented in segment 112 instead of being presented in segment 114, and the image 120 from site A is presented in segment 114 instead of being presented in segment 112. The new location better reflects the interaction between the two conferees 120 and 130 that are sitting in the rooms. The new arrangement delivers a better experience when compared to the arrangement in which conferees sit back to back. Furthermore, the arrangement of the layout will enhance the viewer's experience as a conferee, because the conferees in the new arrangement in the layout may face the center of the layout, as if the conferees are facing the viewer. In some embodiments, the segment 116 with the video image from site C may be centered in the layout. Furthermore, such a layout may facilitate a discussion between conferees 120 and 130.

Interactions between presented sites may include two or more sites that are dominant in the conference, the placement/relative location of a conferee or conferees in a site, the direction the conferee or conferees are facing, etc. Dominant sites may be any two sites that during a certain period of the conference are doing the talking as a dialogue or a discussion, for example, while the rest of the presented conferees are silent. In the present disclosure, the words "dialogue," and "discussion" may be used interchangeably. Different detection techniques may help locate a conferee relative the center of the room. One embodiment of a technique may use information regarding the direction of the conferee's eyes. From observing a plurality of videoconferencing sessions, we found that a conferee located in the left portion of an image typically looks to the right, while a conferee in the right portion looks to the left, with both looking towards the center of the room. (The directions left and right are from the view of the person viewing the image.) In order to determine the interaction between conferees at different sites, one embodiment may process decoded received video images from different sites participating in the session.

Periodically (each decision period), a region of interest (ROI) in each video image may be found and a decision made regarding the relative location of the ROI in each received video image. Based on the results, an MCU in one embodiment may allocate the left segments in a layout to sites in which the conferees (the ROI) are sitting in the left section of the room and right segments to sites in which the conferees (the ROI) are sitting in the right section of the room. As illustrated in FIG. 2, segment 112 is allocated to the site B with the conferee 130, while segment 114 is allocated to site A.

In some embodiments, in which conferees in different sites are sitting in the same relative location (left or right to the center of the room), one or more of the images may be mirrored. Mirroring the image may be done while building the CP layout in some embodiments, for example, by reading the video data from the right edge to the left edge of each row, and writing the video data from left to right from the left edge of the appropriate row in the relevant segment in the CP layout. The location in the layout may be dynamically changed, such as when another site becomes dominant instead of one of the previously dominant sites.

Different algorithms may be used for determining the ROI in each site's video image. From time to time, an embodiment may store a single frame from each one of the video images received from the different sites. Each stored frame may be analyzed in order to define an ROI. Embodiments of the algorithm may analyze the hue of areas of the video image, looking for flesh tone colors to define regions in which a conferee is displayed. Such an embodiment may include a bank of flesh tones colors, for use in detecting conferees.

Other embodiments may use motion detection for determining the ROI location. In one embodiment, the motion detector may be based on motion vectors that are associated with compressed video file. Other embodiments of motion detectors may search for areas of change between consecutive decoded frames.

Other embodiments may use face detection software for determining the location of a face of a conferee. One example of face detection software is the SHORE software from Fraunhofer IIS. SHORE is a highly optimized software library for face and object detection and fine analysis. (SHORE is a trademark of Fraunhofer IIS.) Another such software is the VeriLook SDK from Neurotechnology. Yet another face detection software is the OpenCV originally developed by Intel Corp.

The reader may find additional information on face detection software at www.consortium.ri.cmu.edu/projOmega-.php and www.consortium.ri.cmu.edu/projFace.php. Based on a size and location of a detected face, an embodiment may estimate the location of the ROI relative to the center of the video image.

Another embodiment uses two or more microphones at a site to allow determining the location of the speaker and the ROI of those images in the room by processing the audio energy received from the plurality of microphones, to determine the relative location of a speaker in the room.

In some embodiments, in which a site has a plurality of microphones, the difference in the energy of the audio signal received from each microphone may be used for determining whether one of the conferees is an active conferee while the rest of the conferees in the room are passive or silence.

An active conferee may be defined as a conferee that did more than a certain percentage (70-90%, for example) of the talking in the room for a certain period of time (few seconds to few minutes, for example). If an active conferee is defined, an additional video segment may be allocated in which a portion of the video image from that site is presented that is cropped around the active conferee. This segment may be added to the layout in addition to the segment that presents the entire site.

In some embodiments, cropping area of the video image around the active conferee may be determined by using a face detector in correlation with analyzing the audio energy received from the plurality of microphones. In other embodiments, instead of allocating two segments to a site, one for the video image of the entire group of conferees at the site and one to the area cropped around the active conferee, a single segment may be allocated to the active conferee. Further, the active conferee in the separate segment may be processed and placed in the layout facing the center of the layout.

In some embodiments, the ROI detector may reside in the endpoint and the relative location of the ROI may be transmitted with the video image in a proprietary message or header. In other embodiments, the ROI detector may reside in a MCU.

In yet another example, an RF tracker may be used in order to define the location of a subscriber in the room. The signal may be received by two or more antennas located in the room that are associated with an endpoint. The received RF signals may be processed by the endpoint and the location may be transmitted with the video image in a proprietary message or header.

In some embodiments, other techniques may be used for defining the interaction between different sites. For example, audio energy indication received from each site may be processed. The process may follow the interaction between the speakers for a period of time. If the interaction is between two sites, changes from a first active speaker to a second active speaker and vice versa, such an interaction may reflect a dialogue or a discussion between the two conferees. In such a case the images from the two sites may be placed on an upper row facing each other as in layout 200 images 112 and 114. Those sites may be referred to as dominant sites or dominant conferees. In some embodiments, the dominant sites may be presented in bigger segments. In addition, the audio received from the active conferees may be treated as two simultaneous speakers having the same audio amplification and mixing priority.

In some embodiments, other techniques may be used for defining the interaction between different sites. For example, in a videoconferencing session, content may be presented in one of the segments in addition to the segments that are allocated to video images from the different sites. The content may be presented in a segment in the center of the layout while video images from the different sites may be presented around the segment of the content. Each video image in its allocated segment may be manipulated such that the conferees look toward the content. Further, the endpoint that generates the content may be presented on one side of the content while the other sites may be presented on the other side of the content.

In other embodiments, the relative location of the ROI may be defined manually. In such embodiment, a click-and-view function may be used in order to point to the ROI in each site's video image. A reader who wishes to learn more about click-and-view function is invited to read U.S. Pat. No. 7,542,068, which is incorporated herein by reference in its entirety for all purposes. Alternatively, in some embodiments, the interaction between sites may be defined manually by one of the conferees by using the click-and-view function.

Figure 3:
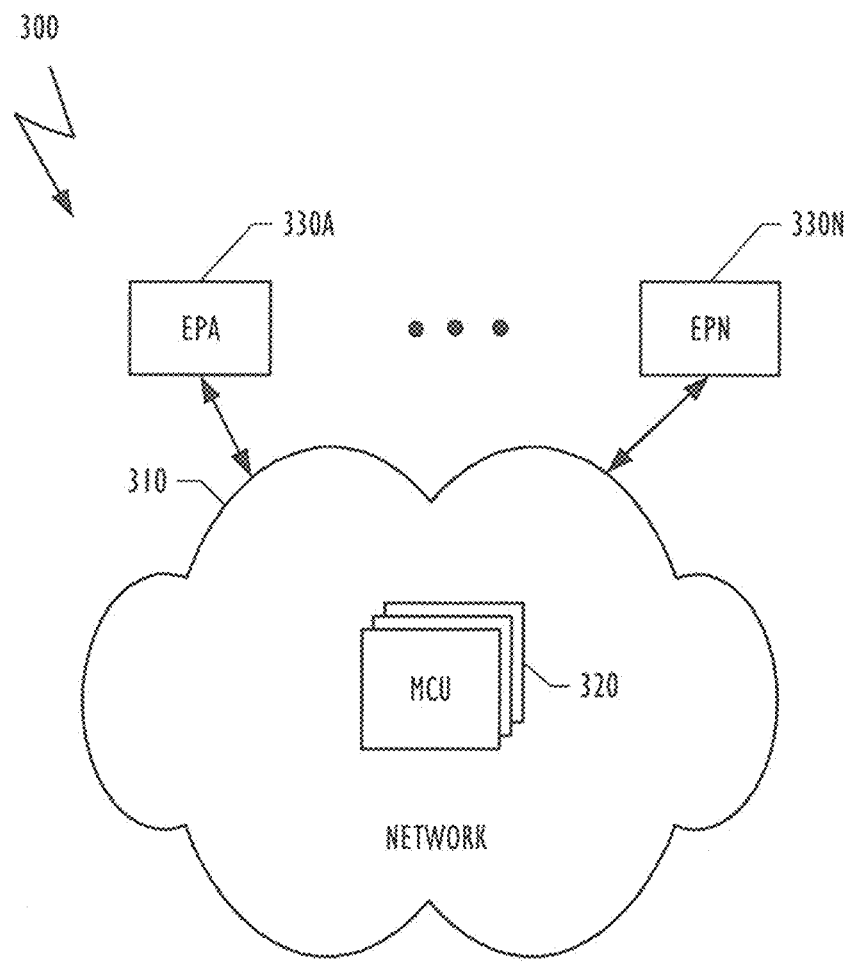
FIG. 3 illustrates a block diagram with relevant elements of a multimedia multipoint conferencing system according to one embodiment.

FIG. 3 illustrates a block diagram with relevant elements of a portion of a multimedia multipoint conferencing system 300 according to one embodiment. The system 300 may include a network 310, connecting one or more MCUs 320, and a plurality of endpoints 330A-N that correspond to a plurality of sites. In some embodiments in which the network 310 includes a plurality of MCUs 320, a virtual MCU may be used for controlling the plurality of MCUs. More information on a virtual MCU may be found in U.S. Pat. No. 7,174,365, which is incorporated herein by reference in its entirety for all purposes. An endpoint 330 is an entity on the network, capable of providing real-time, two-way audio and/or visual communication with other endpoints 330 or with the MCU 320. An endpoint 330 may be implemented as a computer, a mobile device, a TV set with a microphone and a camera, etc.

An MCU may be used to manage a videoconference. An MCU is a conference controlling entity that may be located in a node of a network, in an endpoint, or elsewhere. The MCU may receive and process several media channels, from access ports, according to certain criteria and distributes them to the connected channels via other ports. Examples of MCUs include the MGC-100 and RMX® 2000, available from Polycom Inc. (RMX 2000 is a registered trademark of Polycom, Inc.). Some MCUs are composed of two logical units: a media controller and a media processor. A more thorough definition of an endpoint and an MCU may be found in the International Telecommunication Union ("ITU") standards, such as but not limited to the H.320, H.324, and H.323 standards. Additional information regarding the ITU standards may be found at the ITU website www.itu.int.

In other embodiments of the system 300, the MCUs 320 may be a media relay MCU (MRM) and an endpoint 330 may be a media relay endpoint (MRE). A reader who wishes to learn more about an MRM or an MRE is invited to read U.S. Pat. No. 8,228,363 or U.S. Pat. No. 8,760,492, both of which are incorporated herein by reference in their entirety for all purposes.

The network 310 may represent a single network or a combination of two or more networks. The network 310 may be any type of network, including a packet switched network, a circuit switched network, and Integrated Services Digital Network (ISDN) network, the Public Switched Telephone Network (PSTN), an Asynchronous Transfer Mode (ATM) network, the Internet, or an intranet. The multimedia communication over the network may be based on any communication protocol including H.320, H.324, H.323, SIP, etc.

The information communicated between the plurality of endpoints (EP) 330A-N and the MCU 320 may include signaling and control information, audio information, video information, and/or data. Any combination of endpoints 330A-N may participate in a conference. The endpoints 330A-N may provide speech, data, video, signaling, control, or any combination of them.

An endpoint 330A-N may comprise a remote control (not shown in picture) that may act as an interface between a user in the EP 330 and the MCU 320. The remote control may comprise a dialing keyboard (the keypad of a telephone, for example) that may use DTMF (Dual Tone Multi Frequency) signals, a far end camera control, control packets, etc.

An endpoints 330A-N may also comprise: one or more microphones (not shown in the drawing) to allow conferees at the endpoint to contribute live audio data to the conference; a camera to contribute live video data to the conference; one or more loudspeakers and a display (screen).

The described portion of the system 300 comprises and describes only the most relevant elements. Other sections of a system 300 are not described. It will be appreciated by those skilled in the art that depending upon the system configuration and the needs of the conferees, the system 300 may have any combination of endpoints 330, networks 310, and MCUs 320. However, for clarity, one network 310 with a plurality of MCUs 320 and a plurality of endpoints 330 is shown.

The MCU 320 and endpoints 330A-N may be adapted to operate according to various embodiments to improve the experience of a conferee looking at a CP video image of a multipoint video conference. In embodiments implementing a centralized architecture, the MCU 320 may be adapted to perform the automatic display adaptation techniques described herein. Alternatively, in embodiments implementing distributed architecture, the endpoints 330A-N as well as the MCU 320 may be adapted to perform the automatic display adaptation techniques. More information about the operation of the MCU 320 and endpoints 330A-N according to different embodiments is disclosed below.

Figure 4:
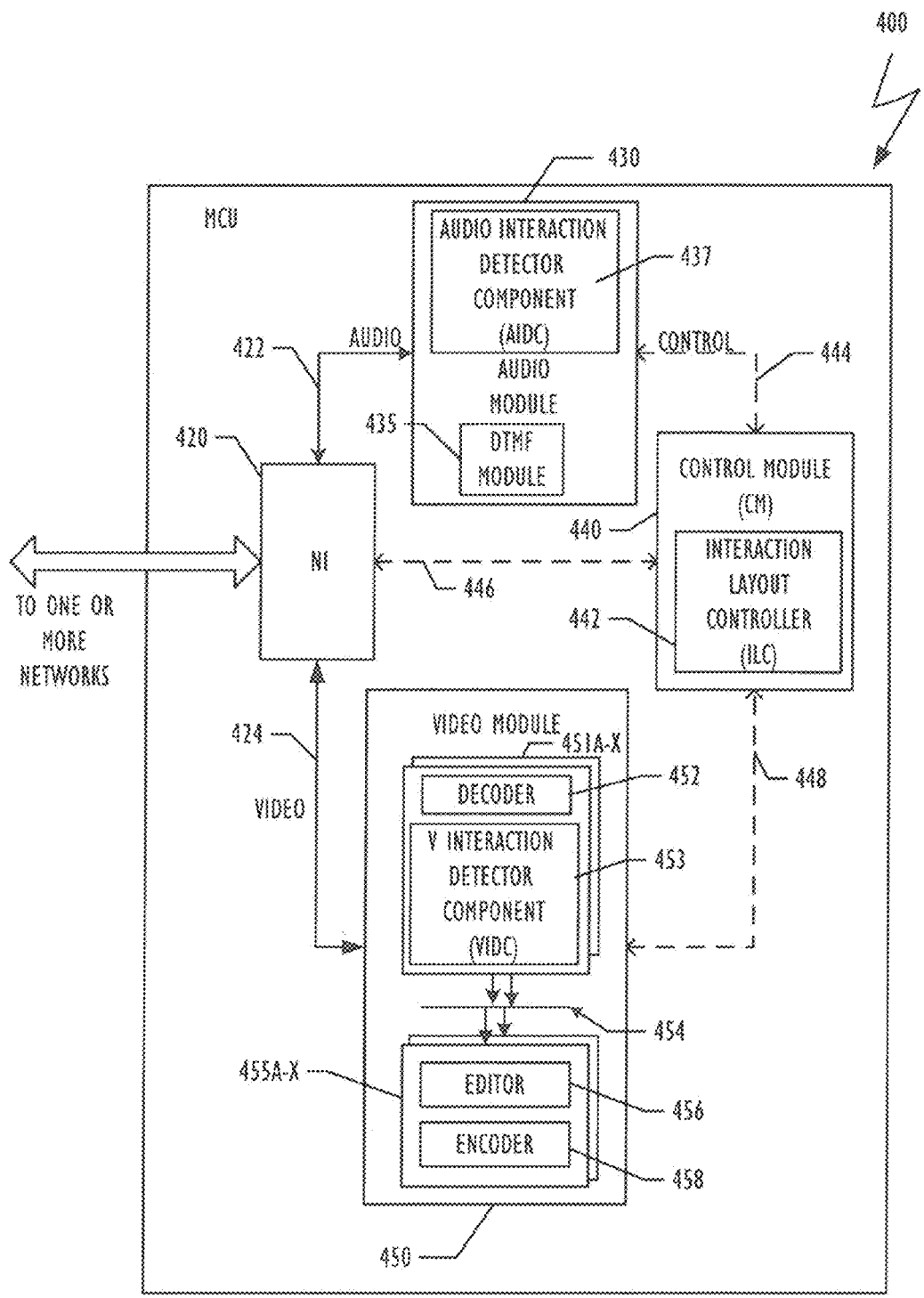
FIG. 4 illustrates relevant elements of an MCU that is capable of dynamically and automatically adapting a CP layout according to the interaction of participants in different sites according to one embodiment.

FIG. 4 illustrates an MCU 400 according to one embodiment. The MCU 400 may include a network interface module (NI) 420, an audio module 430, a control module 440 and a video module 450. Alternative embodiments of the MCU 400 may have other components and/or may not include all of the components shown in FIG. 4. The NI 420 may receive communication from a plurality of endpoints 330A-N via at least one network 310. The NI 420 may process the communication according to one or more communication standards (e.g., H.320, H.321, H.323, H.324, Session Initiation Protocol (SIP), etc.). The NI 420 may also process the communication according to one or more compression standards (e.g., H.261, H.263, H.264, G.711, G.722, MPEG, etc.). The NI 420 may transmit and receive control and data information to and from other MCUs and endpoints. Information concerning the communication between endpoints 330 and the MCU 400 over the network 310 and information describing signaling, controlling, compressing, and setting a video call may be found in the International Telecommunication Union (ITU) standards H.320, H.321, H.323, H.261, H.263, H.264, G.711, G.722, and MPEG etc. or from the IETF Network Working Group website (information about SIP).

The MCU 400 may dynamically and automatically adapt a CP layout according to detected interaction between the presented sites. Interactions between presented sites may include two or more sites that are dominant in the conference, having a discussion; the placement of a person or persons in a site; the direction the person or person are facing; etc. In addition to common operations of a typical MCU, the MCU 400 may be capable of additional operations as result of having the control module (CM) 440. The CM 440 may control the operation of the MCU 400 and the operation of other internal modules. These internal modules may include the audio module 430, a video module 450, etc. The CM 440 may include logic modules that may process instructions received from the other modules of the MCU 400. An embodiment of the control module 440 may process instructions received from the DTMF module 435 via the control line 444. These instructions may be sent as control signals to and from the CM 440. The control signals may be sent and received via control lines: 444, 446, and/or 448. Control signals may include commands received from a conferee via a click and view function, detected status information from the video module 450, etc.

In addition the CM 440 may include an Interaction Layout Controller (ILC) 442 that adapts the layout that will be displayed at each site. The ILC 442 may receive information and updates from the NI 420, including the number of sites that may participate in the conference, the sites that have left the conference, the sites that have joined the conference, etc. Other types of information may include commands regarding the layout that one or more participating site requests, etc.

In one embodiment, the ILC 442 may determine and/or control the layout to be displayed in one or more of the endpoints 330A-N. The ILC 442 may receive control information from the plurality of endpoints 330A-N via the NI 420. The ILC 442 may also receive detected information from the MCU 400 internal units, including the audio module 430, the video module 450, and the relative location of the ROI in the different video images, as well as an indication on a discussion situation received from AIDC 437. The ILC 442 may determine how to arrange each layout based on the information received from other modules and may send control commands to the video module 450 via the control line 448. Example commands may include which video images to display, the placement of each video image in the layout, which image to mirror, which images to scale down or scale up, build or update a layout with a certain number of segments, etc. The ILC 442 may also perform similar functions for the audio module. More information on the ILC 442 is disclosed in conjunction with FIG. 7.

The NI 420 may multiplex and de-multiplex the different signals that are communicated between the plurality of endpoints 330A-N and the MCU 320. The compressed audio signal may be transferred, via a compressed audio bus 422, to and from the audio module 430. The compressed video signal may be transferred, via a compressed video bus 424, to and from the video module 450. The "control and signaling" signals may be transferred to and from control module 440. Furthermore, if a distributed architecture is used, the NI 420 may be capable of handling automatic and dynamic CP layout adaptation related information that is transferred between the control module 440 and the plurality of endpoints 330A-N.

In an embodiment in which the dynamic CP layout adaptation information is sent as a part of a predefined header of a payload of an RTP (Real-time Transport Protocol) packet, the NI 420 may be adapted to process the predefined header to add the automatic and dynamic CP layout adaptation information to the RTP packet and to send the RTP packet toward the endpoints 330A-N, etc. In an embodiment, some of the dynamic CP layout adaptation information may include a request from an endpoint regarding the layout displayed at the endpoint display unit. In alternate embodiments, the dynamic CP layout adaptation information may be sent via a Far End Camera Control (FECC) channel (not shown in FIG. 4), or it may be sent as payload of dedicated packets that comply with a proprietary protocol. In yet another embodiment, the dynamic CP layout adaptation information may be detected and sent by MCU internal modules. The dynamic CP layout adaptation information may include an ROI, the direction the ROI is facing, the relative location of the ROI compared to the center of the video image, and/or interaction between sites, etc.

The audio module 430 may receive, via the NI 420, compressed audio streams from the plurality of endpoints 330A-N. The audio module 430 may decode the compressed audio streams, analyze the decoded streams, select certain streams, and mix the selected streams. The mixed audio stream may be compressed, and the compressed audio stream may be sent to the NI 420, which sends the compressed audio streams to the plurality of endpoints 330A-N. The audio streams sent to the plurality of endpoints may be different. For example, the audio streams may be formatted according to different communication standards and according to the needs of the individual endpoints. The audio stream may not include the audio associated with the endpoint to which the audio stream is sent. However, the audio of this particular endpoint may be included in the audio streams sent to other endpoints.

In an embodiment, the audio module 430 may include at least one DTMF module 435. The DTMF module 435 may detect and/or grab DTMF (Dual Tone Multi Frequency) signals from the received audio streams. The DTMF module 435 may convert DTMF signals into DTMF control data. DTMF module 435 may transfer the DTMF control data via a control line 444 to the CM 440. The DTMF control data may be used for controlling the conference using an interactive interface, such as but not limited to Interactive Voice Response (IVR). In other embodiments, DTMF control data may be used via a click and view function. Other embodiments of the present invention may use a speech recognition module (not shown) in addition to, or instead of, the DTMF module 435. In these embodiments, the speech recognition module may use a conferee's vocal commands for controlling parameters of the videoconference.

The audio module 430 may be further adapted to analyze the received audio signals from the plurality of endpoints 330A-N and determine the energy of each audio signal. Information on the signal energy may be transferred to the control module 440 via the control line 444. In some embodiments, the audio module 430 may comprise an Audio Interaction Detector Component (AIDC) 437. The AIDC 437 may be configured to determine if an interaction occurred in a video session. One embodiment of AIDC 437 may analyze the audio energy received from each microphone, at a certain site, and the analysis of audio energy received from each microphone at the endpoint may be used for determining the ROI and/or the relative location of an ROI at the site. In some embodiments, the energy level may be used as a parameter for appropriately selecting one or more endpoints as the audio source to be mixed in the videoconference. These endpoints may be referred to as selected endpoints or presented endpoints. In other embodiment, the AIDC 437 may be configured to identify two or more dominant conferees. More information about an embodiment for defining two or more dominant conferees is disclosed below in conjunction with FIG. 7A and FIG. 7B. In other embodiments implementing a distributed architecture, the plurality of endpoints 330A-N may have some of the functionality of the audio module 430.

The video module 450 of the MCU 400 may receive compressed video streams from the plurality of endpoints 330A-N. The video streams are sent to the MCU 400 from the plurality of endpoints 330A-N through the network 310 and processed by the NI 420. The NI 420 may then transfer the compressed video stream to the video module 450 for processing. The video module 450 may create one or more compressed CP video images according to one or more layouts that are associated with one or more conferences currently being conducted by the MCU 400.

An embodiment of the video module 450 may include one or more input video modules 451A-X, one or more output video modules 455A-X, and a common video interface 454. The input video modules 451A-X may handle compressed input video streams from at least one of the plurality of endpoints 330A-N. The output video modules 455A-X may generate composed compressed output video streams of CP video images to one or more of the endpoints 330A-N.

The compressed output video streams may comprise several input video streams that form a video stream representing the conference for selected endpoints. The input video streams may be modified. Uncompressed video data may be transferred from the input video modules 451A-X to the output video modules 455A-X through the common video interface 454. The common video interface 454 may comprise any suitable type of interface, including a Time Division Multiplexing (TDM) interface, an Asynchronous Transfer Mode (ATM) interface, a packet based interface, and/or shared memory. The data transferred through the common video interface 454 may be fully uncompressed or partially uncompressed. The operation of an example video module 450 is described in U.S. Pat. No. 6,300,973.

Each input video module 451A-X may comprise a decoder module 452 for decoding the compressed input video streams. In one embodiment, each input video module 451A-X may also comprise a Video Interaction Detector Component (VIDC) 453. In an alternate embodiment, there may be one VIDC 453 for all input video modules 451A-X.

From time to time, periodically, and/or upon receiving a command from the ILC 442 an embodiment of the VIDC 453 may capture, sample, and analyze data of a decoded frame output by the decoder module 452. An embodiment of the VIDC 453 may be adapted to analyze the decoded video frame received from an associated endpoint 330 (one of the plurality of endpoints 330A-N) and define the coordinates of one or more ROIs and/or their relative location in the video image. The analysis of the VIDC 453 may further be used for determining interaction between different endpoints.

An embodiment of a VIDC 453 may detect the ROI and/or relative position of an ROI in a frame of a decoded video image. The VIDC 453 may detect interactions between conferees located at different sites associated with the endpoints 330A-N. The VIDC 453 may communicate to the ILC 442 information from the different input video streams. The information may be sent via the control line 448.

The detection may be done according to one or more different detection techniques: motion detection, flesh tone detectors, audio energy indication of audio signal received from a plurality of microphones located in the same room, face detectors, or any combination of different detection techniques. The indication of the audio signals may be received from the audio module 430. The VIDC 453 may output detected information to the ILC 442 via the control bus 448. More information on the VIDC 453 operations is disclosed in conjunction with FIG. 5A.

In one embodiment, the video module 450 may comprise an input video module 451 for each of the endpoints 330A-N. Similarly, the video module 450 may include an output video module 455 for each of the endpoints 330A-N. Each output video module 455 may comprise an editor module 456. The editor module 456 may receive information and/or control commands from the ILC 442. Each output video module 455 may produce a layout that is customized for a particular endpoint of the plurality of endpoints 330A-N. Each editor module 456 may further comprise an encoder 458 that may encode the output video stream. In another embodiment, an output video module 455 may serve a plurality of the endpoints 330A-N participating in the conference that use the same layout and the same compression parameters.

Video data from the input video modules 451A-X may be sent to the appropriate output video modules 455A-X via the common video interface 454, according to commands received from the ILC 442.

The editor module 456 of the output video module 455 may modify, scale, crop, and place video data of each selected conferee into an editor frame memory, based on the location and the size of the image in the layout associated with the composed video of the CP image. The modification may be done according to instructions sent from the ILC 442. The instructions may take into account the identified interactions, such as discussion between conferees and the identified ROI in an image. Each rectangle (segment) on the screen layout may contain a modified image from a different endpoint 330.

When the editor frame memory is ready with all the modified selected conferee's images, the data in the frame memory may be encoded by the encoder module 458. The encoded video stream may be sent to one or more endpoints 330. The composed and compressed CP output video streams may be sent to the NI 420 via the video bus 424. The NI 420 may transfer the one or more CP compressed video streams to one or more endpoints 330A-N.

In an alternate embodiment, a relay MCU 320 is implemented and the endpoint 330 is capable of building a CP video image to be displayed. In such embodiment, an ILC 442 may be capable of providing commands to the endpoints 330A-N themselves. One embodiment of a relay MCU is disclosed in a U.S. Pat. No. 8,228,363, the content of which is incorporated herein by reference in its entirety for all purposes. In such an embodiment, the size, in pixels for example, of the ROI of each image and the interaction between segments in the layout may be sent to the endpoint 330 with a request to the endpoint 330 to present a layout in an optimal arrangement. The optimal arrangement can reflect interaction modifications that are made to the video image, etc. Communications with the endpoint 330 may be out of band, over an Internet Protocol (IP) connection, for example. In other embodiments, the communication may be in band, for example as part of the predefined header of the payload of an RTP packet, or FECC.

In yet another embodiment of a relay MCU 400, the VIDC 500 and/or the AIDC 437 may be embedded within an endpoint 330 in front the encoder of the endpoint 330. The relative location information may be sent to the ILC 442 at the MCU 400 via the network 310 and the NI 420 as a payload of a detected packet. In such an embodiment, the ILC 442 may send layout instructions to an editor module in the endpoint 330. The editor module in the endpoint 330 may compose the CP layout and present it over the endpoint display unit.

In another embodiment of a relay MCU 400, each endpoint 330A-N may have an VIDC 453 and an ILC 442 in the endpoint control module. The VIDC 453 of the endpoint may send information on the relative location of the ROI in an image received from other endpoints, to the ILC module 442 in the endpoint. In another embodiment of a relay MCU 400, each endpoint 330 may comprise an AIDC 437, and the AIDC 437 may perform similar actions as the VIDC 453 of the endpoint. Such an AIDC 437 may be located after the one or more audio decoder modules and may analyze the received decoded audio for determining the energy of each received audio stream. The audio energy may be used for determining whether a discussion occurs between two or more conferees. The information on the two or more conferees may be transferred toward the ILC 442 at the endpoint 330 and to the audio mixer. The ILC 442 may determine the layout and instruct the endpoint editor module to compose it accordingly. In such a relay MCU 400, each endpoint 330A-N may control its layout as a stand-alone unit. The location of the VIDC 453, AIDC 437, and ILC 442 may vary from one embodiment to another.

Common functionality of various elements of video module 450 that is known in the art is not described in detail herein. Different video modules are described in U.S. Pat. Nos. 8,805,928; 8,289,371; 8,446,454; 6,300,973; 8,144,186 and International Patent Publication No. WO 2002/015556, the contents of which are incorporated herein by reference in their entirety for all purposes. The control buses 444, 448, 446, the video bus 424, and the audio bus 422 may be any desired type of interface including a Time Division Multiplexing (TDM) interface, an Asynchronous Transfer Mode (ATM) interface, a packet based interface, and/or shared memory.

Figure 5A:
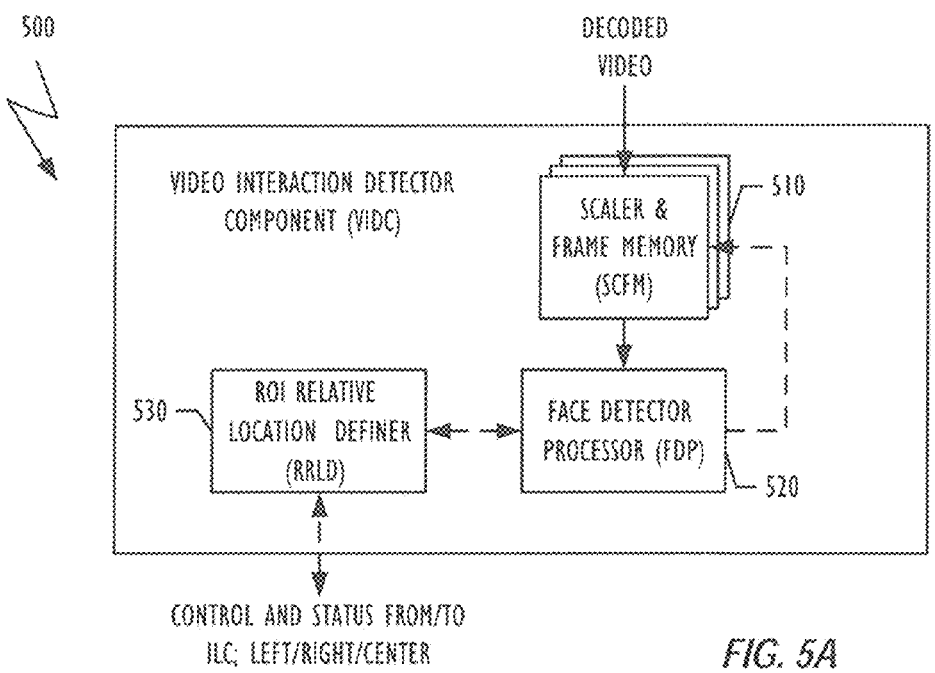
FIG. 5a illustrates a block diagram with relevant elements of a Video Interaction Detector Component (VIDC), according to one embodiment.

FIG. 5A illustrates a block diagram with some elements of a Video Interaction Detector Component (VIDC) 500, corresponding to the VIDC 453 of FIG. 4, according to one embodiment. The VIDC 500 may be used to detect interactions between conferees at two or more sites that are dominant in the conference, the placement/relative location of a conferee in a video image, the direction the conferee is facing, etc. A VIDC 500 may include one or more scaler and frame memory (SCFM) modules 510, a face detector processor (FDP) 520, and an ROI relative location definer (RRLD) 530. The face detector processor (FDP) 520 may be implemented on a processor that is adapted to execute known face detector techniques, such as provided by SHORE, the VeriLook SDK, or OpenCV. In an alternate embodiment, the FDP 520 may be implemented using hardware with face detection capabilities, including a DM365 from Texas Instruments. In one embodiment implementing a centralized architecture, the VIDC 500 may be embedded in an MCU 400. In such an embodiment, the VIDC 500 may be part of the video unit 450, as described above, and may receive the decoded video data from the input video modules 451A-X. In an alternate embodiment, the VIDC 500 may be a part of each of the input modules 451A-X and collects the decoded video from its associated decoder 452.

In yet another embodiment, the VIDC 500 may be embedded within an endpoint 330A-N. In such an embodiment, the VIDC 500 may be used to determine the ROI and the relative location of the ROI in a video image that is generated by the endpoint 330. The VIDC 500 may be associated with the input of an encoder of the endpoint 330 (not shown in the drawings). The VIDC 500 may sample a frame of a video image from a frame memory used at the input of the encoder of the endpoint 330. The indication on the ROI and/or indication on relative location of the ROI may be transferred to the ILC 442 via the NI 420. The indication may be sent in dedicated packets that comply with a proprietary protocol or by adding the information to a standard header. In an alternate embodiment, the information may be sent as a DTMF signal using a predefined string of keys, etc. The ILC 442 may use the information on the ROI to determine how to adapt the next CP layout.

In an embodiment of FIG. 5A, the RRLD 530 may receive a command from the ILC 442. Example commands may include to detect and define an ROI, to detect and define the relative location of an ROI at a site, etc. The ILC 442 may decide which sites to search for an ROI and/or the relative location of an ROI based on different parameters, including audio signal strength, manual commands to change layout, information on a new site that has joined, etc. The RRLD 530 may send a command to the FDP 520 to find and determine an ROI. Based on the location of the ROI, the RRLD 530 may calculate the relative location (left, right, or center of the image) of an ROI in a frame of a video image sent from a certain site.

The FDP 520 may command the SCFM 510 to sample a frame of a decoded video image from a site. The SCFM 510 may fetch a video image from the common interface 454 or from the decoder module 452 of the input video module 451A-X that is associated with the site. The SCFM 510 may then scale down the video image according to the requirements of the FDP 520, and save the result in a frame memory.

A loop between the FDP 520 and the SCFM 510 may occur in one embodiment. The FDP 520 may request the SCFM 510: to scale down an image again, to scale up an image, and/or to fetch another sample, etc. This loop may be limited to a predefined number of cycles. At the end of the cycle, the FDP 520 may transfer information on the found ROI to the RRLD 530. In case that no ROI was found, a message (such as no ROI, for example) may be sent to the RRLD 530. The RRLD 530 may output the information on the relative location to the ILC 442 via the control line 448. In yet another embodiment, the VIDC 500 may transfer the location of the ROI coordinates, for example in pixels from top left, to the ILC 442, and the ILC 442 may calculate the relative location (left, right or center) in the video image.

Another embodiment of VIDC 500 may comprise other modules for determining the location of the ROI in a video image, using techniques that include motion detectors, flesh tone detectors, and/or different combination of different detectors. Some embodiments (not shown in the drawings) that are based on motion detectors may include one or more filters such as band-pass filters, low-pass filters or notch filters to remove interference motions such as clocks, fans, monitors, etc. Other embodiments may process the audio energy indication received from a plurality of microphones. A person who wishes to learn more on the different ROI detectors may read U.S. patent application Ser. No. 11/751, 558; U.S. patent application Ser. No. 12/683,806; or visit www.consortium.ri.cmu.edu/projOmega.php or www.consortium.ri.cmu.edu/projFace.php.

In some embodiments, a motion detector may be used for determining the ROI. In one embodiment, the motion detector may subtract two consecutive frames in order to define a region with changes. In videoconferencing, changes are typically due to movement of the heads, hands, etc. An ROI may be defined as a larger rectangular surrounding the area that differs between two consecutive frames. The consecutive frames may be stored in the one or more SCFMs 510.

In some embodiments of the VIDC 500, other techniques may be used for defining the interaction between conferees located at different sites. For example, audio energy indications received from each endpoint may be processed by an audio module 430 and then sent to the VIDC 500. The process may follow the interaction between the conferees for a period of time. If the interaction is a vocal interaction between dominant sites then those two sites can be considered dominant sites. The images from the two dominant sites may be placed on the upper row facing each other as in layout 200 images 120 and 130. In this embodiment, the VIDC 500 may receive the information on the audio energy from the audio module 430, and/or from the control module 440.

In one embodiment, in which a site has a plurality of microphones, the location of the active conferee at the site and the ROI of those images may be determined by processing the audio energy received from the plurality of microphones to determine the relative location of the active conferee. In some embodiments, the RRLD may reside in the endpoint 330 and the relative location of the ROI may be transmitted with the video image in a proprietary message or header. More information on detection of two or more dominant sites is disclosed below in conjunction with FIGS. 5B and 6A.

Communication between the RRLD 530 and the control module 440 may depend on the architecture used. For example, if the VIDC 500 is embedded within a video module 450 (FIG. 4) of the MCU 400, the communication between the RRLD 530 and the control module 440 may be implemented over the control line 448 connecting the control module 440 with the video module 450.

Alternatively, in an embodiment in which VIDC 500 is located at an endpoint 330A-N while the control module 440 is located at the MCU 400, the communication may be implemented out of band or in band. Out of band communication may be handled via a connection between the endpoints 330A-N and the MCU 400 over an Internet Protocol (IP) network. An example of in band communication may be implemented when the multimedia communication with the endpoint 330 is done over a packet switched network, then the communication between VIDC 500 (at the endpoint 330) and control module 440 may be implemented using a predefined header of the payload of a Real-time Transport Protocol (RTP) video packet. In such an embodiment, the coordinates of the ROI and/or relative location of an ROI as well as the sampling command may be embedded within the predefined header of the payload of the RTP video packet. Other embodiments may use DTMF and/or FECC channels.

If communication between the VIDC 500 at the endpoint 330, and control module 440 is implemented via multimedia communication, as described above, the NI 310 may be adapted to parse the received information and retrieve the coordinates of the ROI and/or relative location of an ROI received from the VIDC 500. The NI 310 may deliver the information to the control module 440 over the control bus 446 that connects the control module 440 and the NI 420. The NI 420 may be adapted to receive sampling commands, to process them according to the communication technique used, and to send the processed commands via the network 310 to the VIDC 500.

Based on the results, an ILC 442, according to one embodiment, may design an updated layout taking into account the detected ROI and/or its relative interaction and relative location. Instructions how to build the updated layout may be transferred to the editor module 456. The editor module 456, according to the updated layout, may allocate left-aligned segments to video images of sites in which the conferees are sitting in the left side of the video image, and vice versa, as illustrated in FIG. 2, in which the left segment 112 is allocated to the site B with the conferee 130, sitting in the left side of the image, and the right segment 114 is allocated to site A with the conferee 120 sitting in the right side of the image.

In some cases in which conferees in different sites are sitting in the same relative location (left or right to the center of the room), the ILC 442 may send commands to the editor module 456 to mirror one or more of the video images. In one embodiment, mirroring the image may be performed while building the CP layout. Mirroring may be implemented by reading the video data from the right edge the left edge of each row, and writing the video data from left to right from the left edge of the appropriate row in the relevant segment in the CP layout.

In yet another embodiment, an RF tracker may be used by the RRLD 530 to define the relative location of a conferee in the room. The RF signal emitted by the RF tracker may be received by two or more antennas at the site that is associated with the endpoint 330. The received RF signals may be processed by the endpoint 330 and information may be transmitted with the video image in a proprietary message or header.

Figure 5B:
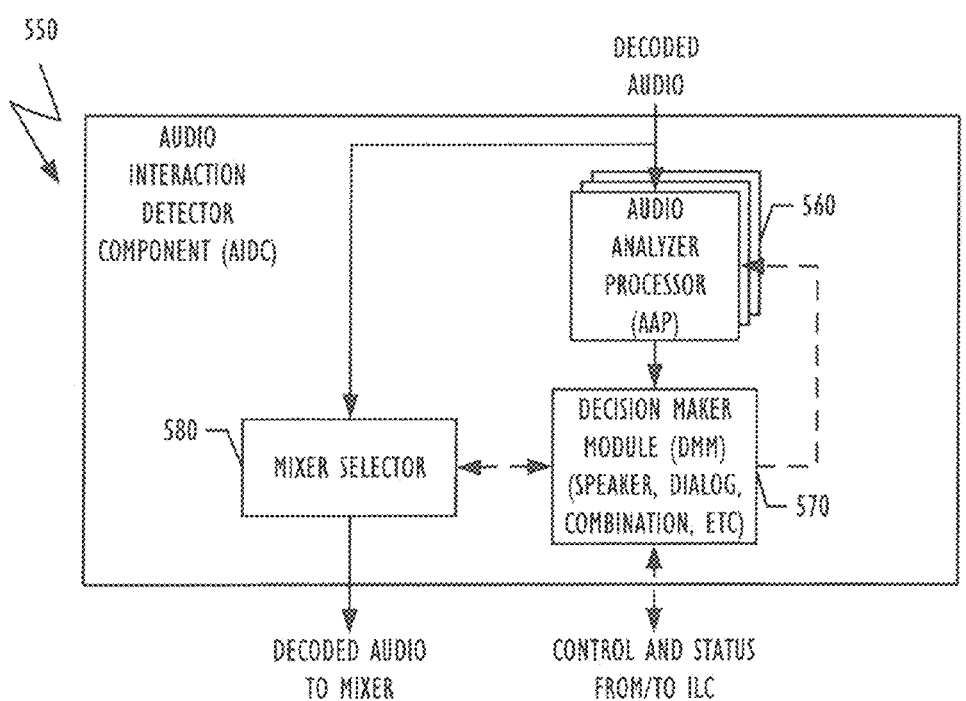
FIG. 5b illustrates a block diagram with relevant elements of an Audio Interaction Detector Component (AIDC), according to one embodiment.

FIG. 5B illustrates a block diagram of an Audio Interaction Detector Component (AIDC) 550 according to a possible embodiment. The AIDC 550 may be used to detect interaction between conferees at selected sites, including interactions between two or more sites that have dominant conferees for a certain period of time in the conference. The AIDC 550 may determine interactions based on the audio signals obtained from the different transmitting endpoints. An AIDC 550 may include one or more audio analyzers processors (AAP) 560, a Decision Maker Module (DMM) 570, and a mixer selector 580. An AAP 560 may be associated with a decoded audio stream received from a certain transmitting endpoint. In one embodiment implementing a centralized architecture, the AIDC 550 may be embedded in an MCU 400. In such an embodiment, the AIDC 550 may be a part of the audio module 430, as described above, and may obtain the decoded audio data from the audio decoder module (not shown in the drawings).

In another embodiment, the AIDC 550 may be embedded within a media relay endpoint 330A-N adapted to obtain one or more streams of compressed audio generated by a plurality of endpoints 330A-N. In such an embodiment, the endpoint is capable of decoding the received audio streams, selecting a set of decoded audio streams, mixing the selected decoded audio and sending the mixed audio to one or more loudspeakers of the endpoint. In such embodiment, the AAP 560 and the DMM 570 may analyze the obtained decoded audio streams, select a set of decoded streams to be mixed by the endpoint, and instruct the mixer selector 580 accordingly.

In one embodiment, the AAP 560 may periodically determine the audio energy related to the associated audio stream for a certain sampling period. The sampling period of may have a range of few tens of milliseconds (e.g., 10-60 milliseconds). In some embodiments the sampling period may be similar to the time period included in an audio frame (e.g., 10 or 20 milliseconds). The indication about the audio energy for that sampling period may be transferred to the DMM 570. Some embodiments of the AAP 560 may utilize a Voice Activity Detection (VAD) algorithm for detecting human speech in the audio stream. The VAD algorithm may be used as a criterion for using or not using the value of the calculated audio energy. The VAD algorithm and audio analyzing techniques are well known to a person having ordinary skill in the art of video or audio conferencing.

In one embodiment, the DMM 570 may obtain from each AAP 560 periodic indications of the audio energy, with or without using the VAD algorithm. The DDM 570 may compare the audio energy between the different streams in order to select a set of two or more streams (two or more endpoints) to be mixed during the next period. The number of selected streams may depend on the capability of the audio module 430 (FIG. 4), or on a parameter that was predefined by a conferee. The selected criteria may include a certain number of streams that have the highest audio energy during the last period, a manual selection, etc.

In addition to selecting two or more streams to be mixed, a possible embodiment of DMM 570 may be configured to determine the mode of interaction between two or more conferees. The interaction may reflect a single active conferee; another mode may comprise a discussion between conferees located at two or more sites; and a third mode may be referred as a "Parliament" mode in which many conferees are speaking almost simultaneously. Other embodiments may use other modes of interaction. Additionally, the DMM 570 may be configured to determine when a conferee joins the discussion, when a conferee leaves the discussion, etc. The indication on the mode of interaction may be transferred toward the ILC 442 that may define a layout that reflects the current mode of interaction. An example of a discussion layout is illustrated in FIG. 2, in which conferees 130 and 120 are presented in a layout that reflects a discussion mode.

In order to determine the mode of interaction, the DMM 570 in one embodiment may monitor the audio energy of each conferee for a period of time. The monitoring period (MP) may be in the range of few seconds (e.g., 1-15 seconds). A typical period may be between 3-5 seconds. An example of the DMM 570 may manage a "Speaker Table" stored in a memory device. Each row in the table may be associated with a sampling period and each column in the table may be associated with a conferee. At the end of each sampling period, the DMM 570 may obtain, from each AAP 560, an indication that is related to the audio energy received from the conferee associated with that AAP 560. The indication related to that sampling period and that conferee may be written (stored) in the table in the cell that is in the junction between the row that is associated to that sampling period and the column that is associated to that conferee. An example of a Speaker Table may be stored in a cyclic memory that may be configured to store information for a few MPs.

At the end of a MP, the DMM 570 may analyze the information stored in the Speaker Table in the rows that were added during that MP. An example of the DMM 570 may observe the distribution of the audio energy for that MP to determine the mode of interaction in that MP. In the case where a single conferee has the highest energy for 60% or 70% of the time, the defined mode of interaction may be a monologue and that conferee may be selected as the active conferee for the next MP. In the case where the audio energy was divided between two or three conferees during that MP, the defined mode of interaction may be a discussion and those two or three conferees may be defined as the current active conferees in the discussion. If the audio energy is divided between more than three conferees, then the mode of interaction may be defined as the "Parliament" mode. The defined mode of interaction and the one or more active conferees for that MP may be stored in a change mode table (CMT). An example CMT may be a cyclic table that may store the results of few MPs.

In another embodiment of DMM 570, at the end of each MP, DMM 570 may calculate the audio energy related to the rows that were added during that MP. The sum of the values of the audio energy written in each column for those rows is calculated and be stored as the audio energy of the conferee that is associated to that column. At the end, the energy of all of the conferees is added and be stored as the audio energy for that MP. Next the percentage of the audio energy of each conferee from the total audio energy of that MP can be calculated. In case that the audio energy of a certain conferee is above 50% the define mode for the next MP can be a single speaker, if two or three conferees has above 25% of the audio energy of that MP then the next MP can be defined as a discussion mode. If the audio energy is distributed in a similar way between more than three conferees, the mode is defined as "parliament" mode. The defined mode and the one or more speakers for that MP can be stored in the CMT. Every few MPs (2-10 MPs for example) at the end of the last MP of that period, the CMT may be analyzed in order to determine the next mode of interaction to be presented in the next layout to be used. At the end of a current MP, an example of DMM 570 may compare the current mode with the mode during the last few MPs (2-10 MPs, for example). If there is a change, then the layout may be adapted to reflect the current mode of interaction and the current one or more speakers may be presented accordingly. If there is no change, then the layout remains without a change and the current speakers may be presented according to the layout.

In some embodiments, when the DMM 570 determines a change in the mode of interaction or a change between conferees that were selected as active conferees, the DMM 570 may increase the MP for additional sampling periods in order to verify that the change is a real change and not noise.

The indication on the mode of interaction and the dominant conferees may be transferred to the ILC 442. The ILC 442 may use this information to determine how to adapt the next CP layout. More information about an example method for defining two or more dominant conferees is disclosed below in conjunction with FIGS. 7A and 7B.

Figure 6A:
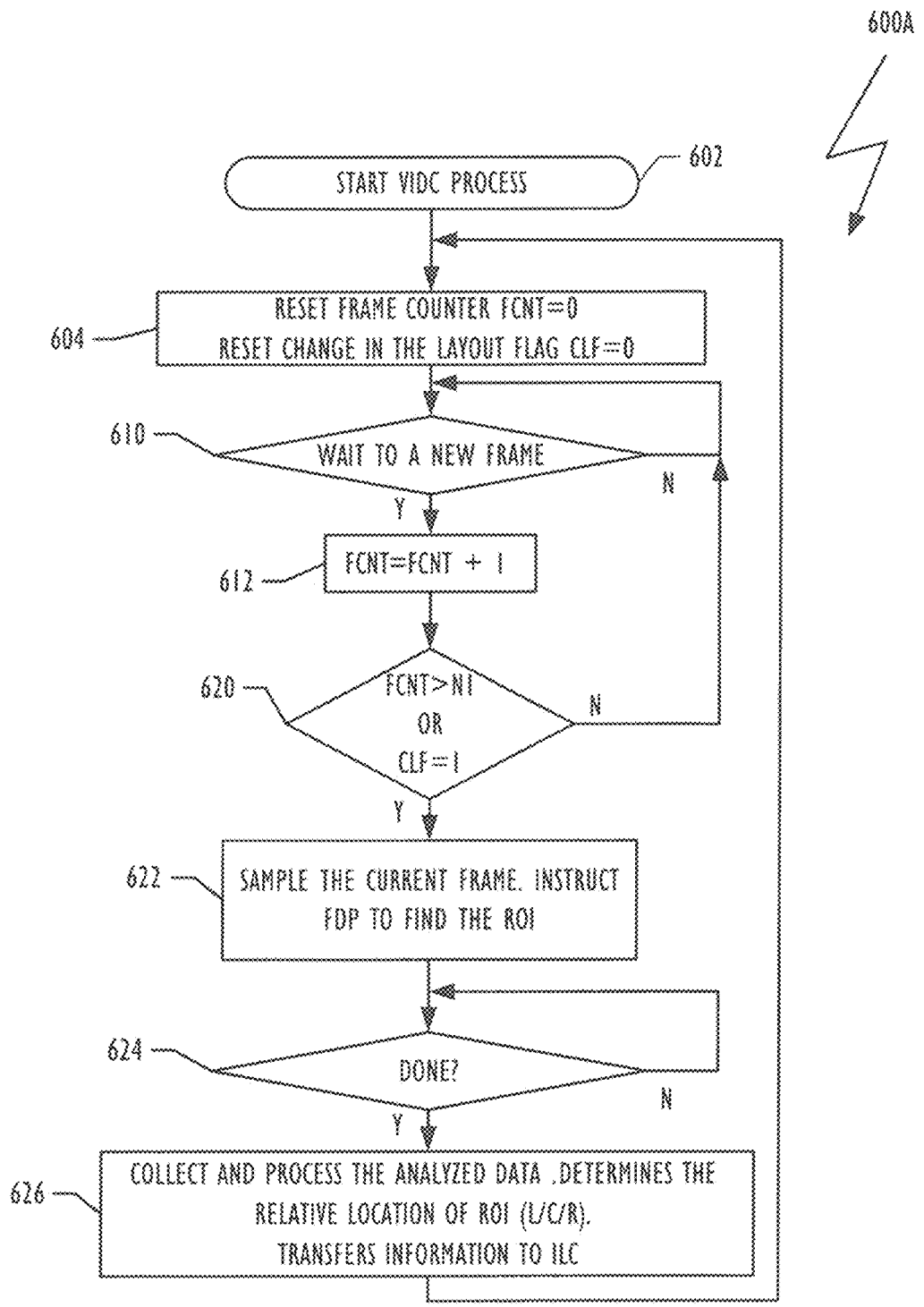
FIG. 6a illustrates a flowchart for a technique of defining interaction between sites in the different sites in a videoconferencing system, according to one embodiment.

FIG. 6A illustrates a flowchart for a technique 600A according to one embodiment that may be executed by a VIDC 500. Technique 600A may be used for defining the ROI and its relative position in a video image. Technique 600A may be initiated in block 602 upon initiating of a conference. After initiation, technique 600A may reset in block 604 a frame counter (Fcnt) and a change-layout flag (CLF). In one embodiment, Fcnt may count the frames at the output of an input video module 451A-X. The change-layout flag (CLF) value may be 0 or 1. The CLF value equals 0 if no change in a layout has been indicated. The CLF value equals 1 if a change in a layout has been indicated and this indication was received from the ILC 442. A change in the layout may occur as result of a change in audio signal strength, management requests, a new conferee, etc. The change indication may include information on the new layout, information on the presented conferees and their associated input and output video modules (451A-X and 455A-X respectively). In some embodiments, the CLF may be set arbitrarily by the CM 440 or by one of the conferees by using the click-and-view function. The ILC 442 may request the RRLD 530 to search for an ROI and its relative position in the site's image.

Next, technique 600A may wait at block 610 to receive a new frame. If, at block 610, a new frame is received, then technique 600A may proceed to block 612 and increment the Fcnt by one. Next, block 620 determines whether the Fcnt value is greater than a predetermined value N1 or if the CLF value equals 1. In one embodiment, N1 may be a configured number in the range 1-1000. If, at block 620, the Fcnt value is not greater than N1 and the CLF value equals 0, then technique 600A returns to block 610 and waits for a next frame. If, at block 620, the Fcnt value is greater than N1 and/or CLF value equals 1, then technique 600A may proceed to block 622. In one embodiment, a timer may be used instead of or in addition to Fcnt. The timer may be set to any desired period of time (e.g., a few seconds or a few minutes).

At block 622, the technique 600A may instruct the FDP 520 to search and define an ROI. The technique 600A waits at block 624 until the FDP 520 defines an ROI or informs the VIDC 500 that no ROI has been found. Once the FDP outputs an ROI message, the technique 600A proceeds to block 626 to collect and process the analyzed data from the FDP 520. Block 626 may determine the existence of an ROI, its size, location (e.g., in pixels from top left), and its relative location in the image (e.g., right, left, or center). The results may be transferred in block 626 to the ILC 442, and technique 600A may return to block 604. In an alternate embodiment, if an ROI is not found, the value of N1 may be reduced in order to accelerate the following ROI search.

Technique 600A may act as an application program interface (API) between the FDP 520 and the ILC 442. In some embodiments, technique 600A may repeat blocks 622, 624, and 626, to ensure that the results are similar and if they are, technique 600A may transfer an average ROI and ROI relative location to the ILC 442.

Figure 6B:
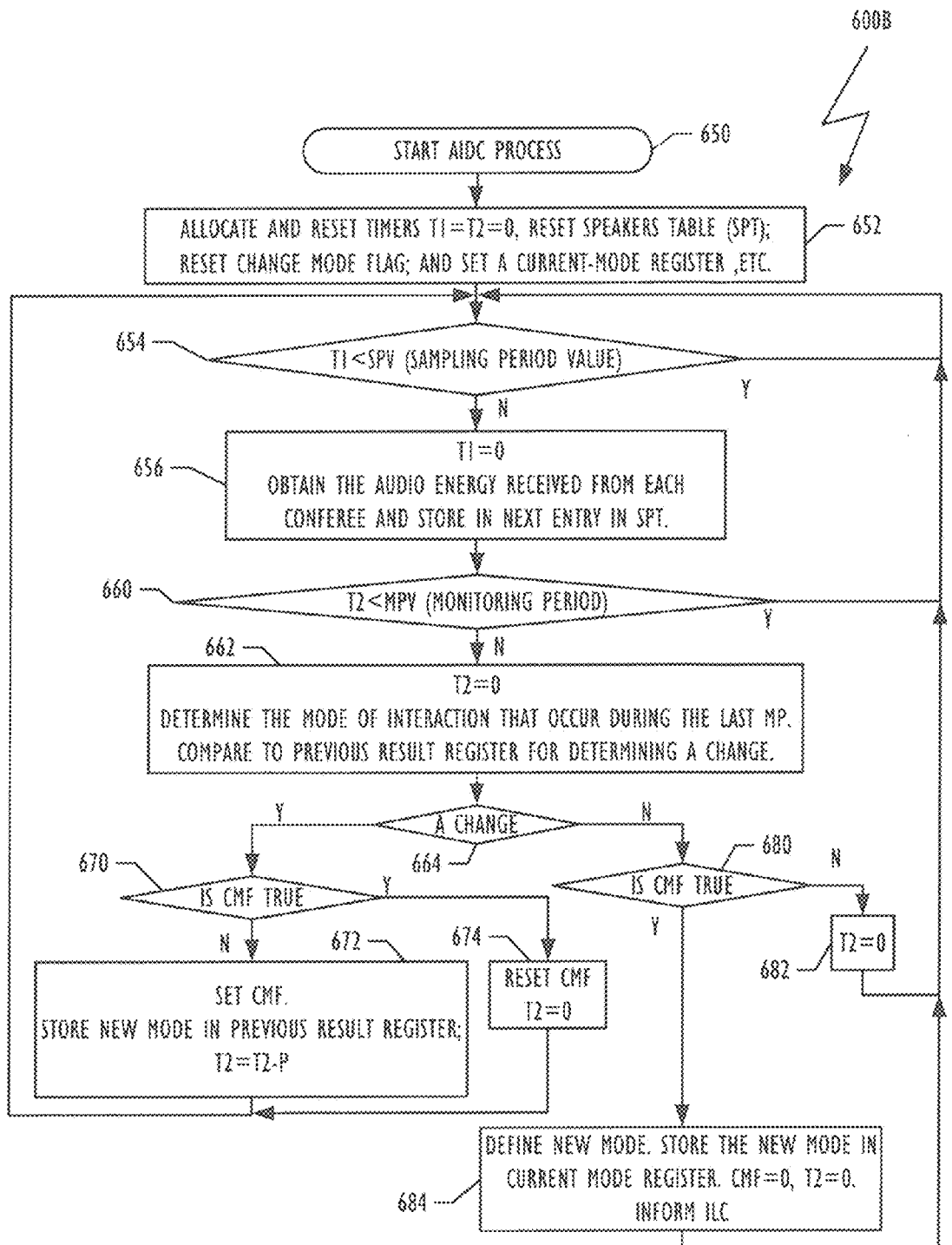
FIG. 6b illustrates a flowchart for a technique of defining discussion between sites in a videoconferencing system, according to one embodiment.

FIG. 6B illustrates a flowchart of a technique 600B according to one embodiment that may be executed by the DMM 570 (FIG. 5B). Technique 600B may be used for defining a change in the current mode of the interaction between conferees in a videoconferencing session. In one example of method 600B, three modes are described. The first mode is a monologue mode. The second mode is a discussion mode, involving a discussion between two or three dominant speakers. The third mode may be referred as the "Parliament" mode in which many conferees are speaking almost simultaneously. Other embodiments may use other modes of interaction.

In addition, technique 600B may be used for determining changes of active conferees and modes of interaction. The information about changes of active conferees and the current mode of interaction may be transferred to the ILC 442 (FIG. 4), which may use this information for selecting an appropriate layout and associating the conferees to the segments in the layout. A layout with a single large segment may be used for a mode of interaction involving a monologue or a single active conferee. A layout with two large segments and few small segments may be used for a mode of interaction involving a discussion or a dialogue. In such a layout, the conferees in each large segment may be placed looking at each other as it is illustrated in FIG. 2, conferees 120 and 130. A layout with a plurality of segments of similar sizes (2×2, 3×3, etc.) may be used for a "Parliament" mode, etc.

Technique 600B may be initiated upon establishing of a conference (block 650). After initiation, technique 600B may allocate and reset in block 652: a timer T1, a timer T2, a "Speaker table" (SPT), and a Change mode flag (CMF). Additionally, a current-mode register may be allocated and may be defined according to the possible modes of interaction. Other exemplary embodiments of technique 600B may start with a monologue mode. Furthermore, a register for storing a previous-change-in-mode register may be allocated and reset. Timer T1 may be used for defining the sampling period (SP). The SP may range from a few milliseconds to a few tens of milliseconds. An example value of SP may be 10-60 milliseconds. In some embodiments, the SP may be proportional to the audio frame rate. Timer T1 may have a clock of few KHz (e.g., 1-5 KHz). Timer T2 may be used for defining the MP. Timer T2 may have a clock of a few pulses per seconds to a few tens per second. In some embodiments the SP may be used as a clock for timer T2. The allocated SPT may be adapted to the number of conferees participating in the conference and to the values of MP and SP (MPV and SPV respectively) that are used in the conference. The content of the SPT may be overwritten in a cyclic mode.

At block 654, the value of timer T1 may be checked in order to determine whether the next sampling may be implemented. If the value of T1 is smaller than the SPV (block 654), then technique 600B may wait at block 654 until T1 is not smaller than SPV. When T1 is not smaller than SPV, then, at block 656, the DMM 570 (FIG. 5b) may reset the timer T1 and start obtaining, from each of the AAPs 560 (FIG. 5B), an indication about the audio energy received from the conferees. The obtained audio energy indication may be stored in a new row of the SPT, in a cell that corresponds with the new row and the column related to the conferee (block 656). After collecting and writing the audio energy of each conferee in the appropriate cell, process 600B may proceed to block 660.

At block 660, a decision is made whether the timer T2 is smaller than the MPV. If the timer T2 is smaller than the MPV, then technique 600B returns to block 654 to wait for the next sampling period. If T2 is not smaller than MPV, then at block 662, the timer T2 is reset and technique 600B may retrieve and analyze the audio energy indication stored in the section of the SPT that comprises the rows that were added during the currently terminated MP. At the end of block 662 the mode of interaction as well as the one or more active conferees that participated in the conference during the terminated MP may be defined.

An example of block 662 may comprise calculating the total audio energy for each conferee for the terminated MP. The total audio energy may be calculated by summing the audio energy values stored in each cell along the column that is related to that conferee in the relevant rows in the SPT. Next, the total audio energy of the terminated MP may be calculated by summing the values of the total audio energy of each one of the conferees. Using the value of the total audio energy for the terminated MP, block 662 may calculate the percentage of the audio energy related to each conferee from the total energy of that MP. At this stage, the DMM 570 may observe the audio energy contributed by each conferee to the total audio energy of the terminated MP. If a single conferee contributes more than 50 or 60% of the total energy, then block 662 may determine that the mode of interaction that occurred during the terminated MP was a monologue and the conferee, having 50 or 60%, may be defined as the dominant speaker for the terminated MP. If two or three conferees contribute more than 25% but less than 50% of the total audio energy, then block 662 may conclude that the mode of interaction was a discussion and those two or three conferees were the dominant conferees for the terminated MP. Finally, if most of the conferees contributed approximately equal amounts to the total audio energy, then block 662 may determine that the mode of interaction during the terminated MP was "Parliament" with no unique active conferee. Additionally, an indication pointing to the one or more active conferees may be transferred to the ILC 442 (FIG. 4).

After determining the mode of interaction and the one or more dominant conferees of the terminated MP (block 662), the determination is compared to the information stored in the previous-change-in-mode register and a decision is made whether there is a change from the previous change in the mode of interaction (block 664). If there is a change, then a decision may be made whether the value of the CMF is "true" (block 670). If the value of CMF is not true, then the CMF may be set to true and the value of the timer T2 may be set to 'MPV-P' (block 672). 'P' represents a parameter that may range from zero to MPV. A possible value of 'P' may be 10-50% of MPV. Other possible embodiments may use other values for 'P'. Further, the value of "P" may be adapted to the type of the conference and may be changed from one conference to the other. Additionally, the mode of interaction may be stored in the previous-change-in-mode register. Next, technique 600b may return to block 654. If, on the other hand, the CMF is true in block 670, then the mode of interaction that was written in the current-mode register is copied to the previous-change-in-mode register (block 674). The layout and the mode of interaction may remain without a change and the CMF may be reset. Then, timer T2 may be reset (block 674) and process 600B returns to block 654 to start a new MP. In this possible embodiment, a second change occurring 'P' seconds after the first change, the change that set the CMF, may be ignored as a noise.

If there is no change in the mode of interaction (block 664), then at block 680, the CMF is checked and a determination is made on whether CMF is true. If CMF is false in block 680, indicating that no change occurs, the timer T2 may be reset (block 682) and technique 600B returns to block 654 to start another MP. If the CMF is true, indicating that the previous change was stable for the last 'P' seconds after the terminated MP, then at block 684, the CMF and T2 may be reset. Additionally, the value of the previous-change-in-mode register may be copied to the current-mode register and the ILC 442 (FIG. 4) may be informed about the new information stored in the current-mode register. The ILC 442 may use this information for defining the layout and the selected conferees to be presented during the next MP. Finally technique 600B may return to block 654 to start a new MP.

Blocks 670, 672, 674, 680, and 682 may be used as a verification process for checking whether a defined change is stable for the next 'P' seconds. Other embodiments of technique 600B may not use blocks 670, 674, 680, and 682 and may proceed directly to block 672 or 684. Yet in other possible embodiments, the value of 'P' may be changed during the conference. The DMM 570 (FIG. 5b) may adapt the value of 'P' to the rate of changes of the mode of interactions that occur in the conference.

Yet in an alternate embodiment, in which the change-mode table (CMT) is used, then blocks 664 to 684 may be modified. At block 664 the CMT may be analyzed in order to determine the mode of interaction. The current mode may be compared to the mode during the previous MPs (e.g., 2-5 MPs). If there is a change between the modes of interactions, then the mode for the next MPs may be the current mode of interaction. An indication about the current mode may be transferred to ILC 442 (FIG. 4) and the current mode may be stored in CMT in place of the oldest mode that is stored in the CMT. Then technique 600B may return to block 654. The ILC 442 may use the information about the current mode of interaction for adapting the layout, which may be used in the next few MPs, to reflect the mode of interaction. If there is no mode change, then the mode of interaction may remain without a change, reflecting the previous mode of interaction. The current mode may be stored in CMT in place of the oldest mode that is stored in the CMT. Then technique 600B may return to block 654 without interrupting the ILC 442.

Figure 7A:
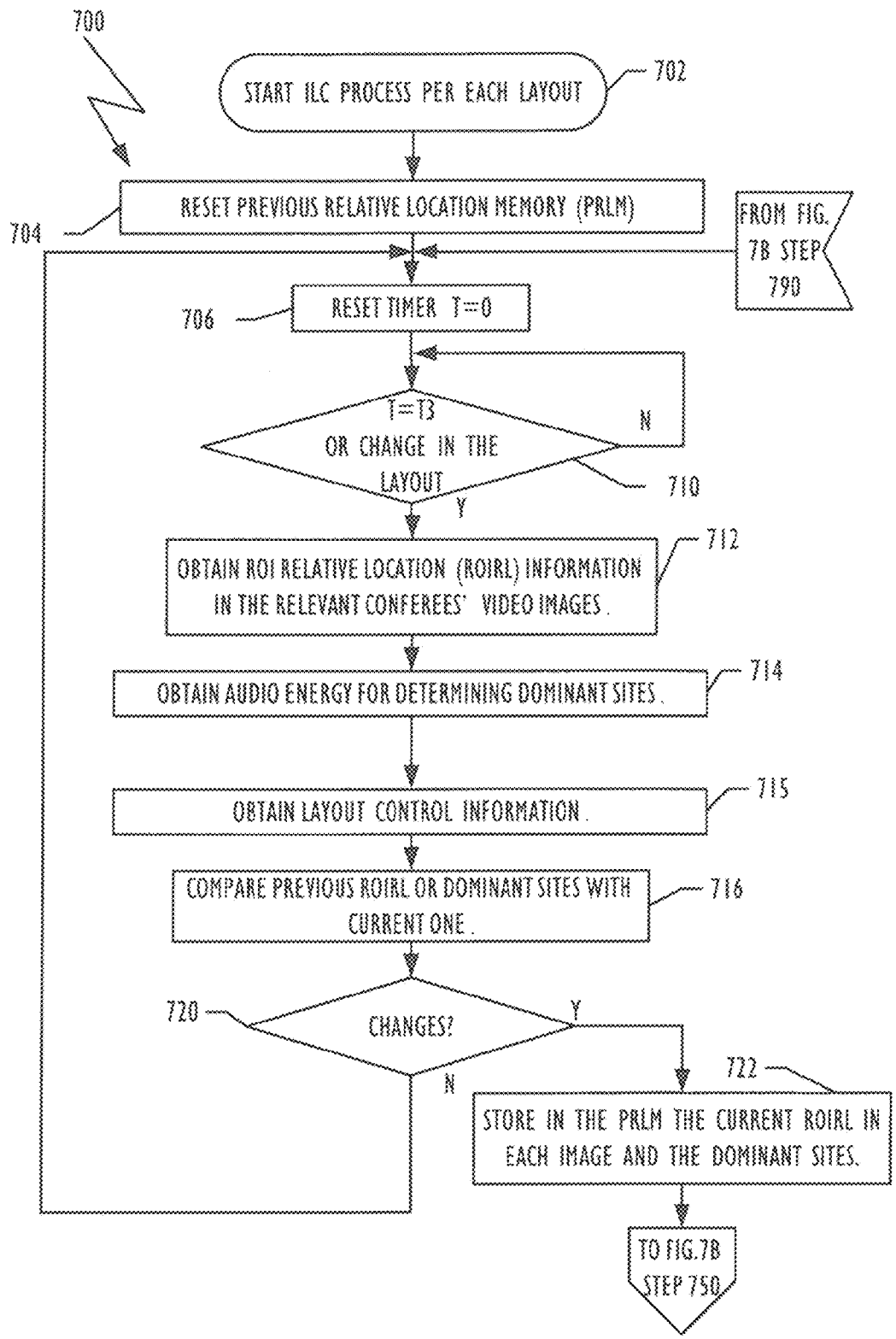
FIGS. 7A and B illustrate a flowchart for a technique of automatically and dynamically adapting one or more CP layouts, according to one embodiment.
Figure 7B:
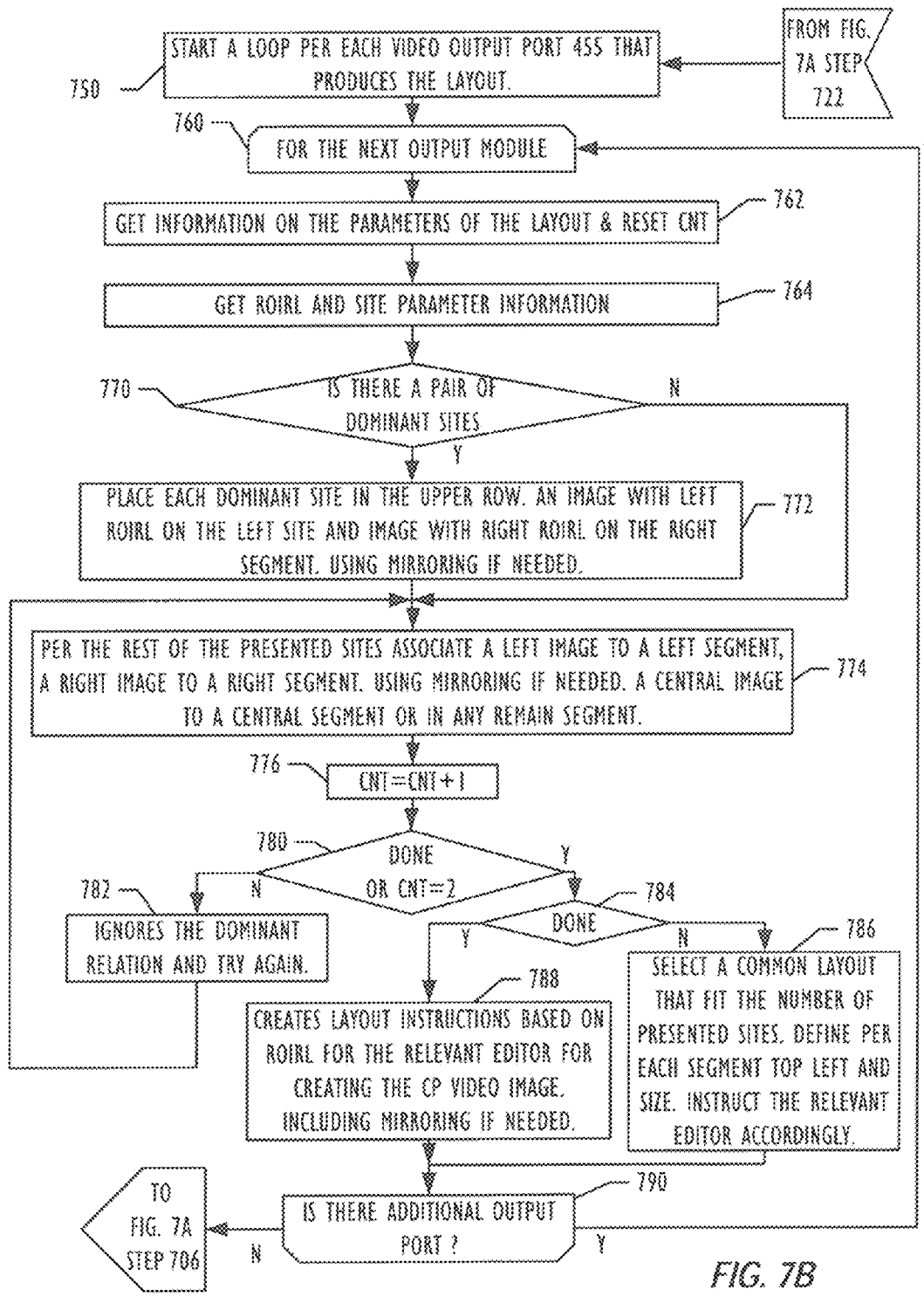

FIGS. 7A and 7B illustrates a flowchart for one embodiment of a technique 700 for automatically and dynamically adapting one of the layouts that is used in a video conference. In one embodiment, if more than one layout is involved, parallel tasks may be initiated for each layout of a CP image. In another embodiment, technique 700 may be run repeatedly, one cycle for each layout that is used in the session. Technique 700 may be initiated in block 702 by an ILC 442 and/or by the RRLD 530 (FIG. 5). At initiation, technique 700 may reset in block 704 a Previous-Relative-Location memory (PRLM). The PRLM may be used for storing information on the previously found relative position of an ROI to determine the differences with the current relative position of the ROI. Next, technique 700 may reset in block 706 a timer (T) and wait at block 710 for the timer T value to equal T3. In one embodiment, T3 may range from a few hundreds of milliseconds to a few seconds. In another embodiment, frames of the CP image may be counted and be used instead of time. In some embodiments, T3 may be equal to MPV. Once timer T value equals T3 and/or a change in a layout has occurred, technique 700 may proceed to block 712. Changes in a layout may occur when an additional conferee has joined the conference, when a selected site needs to be replaced due to changes in the audio energy of the different conferees, etc.

At block 712, technique 700 may collect information on the ROI relative location (ROIRL) information in the relevant conferees' video images. The relevant conferees' video images are the video images that were selected for presentation in a layout. Next, audio energy information may be obtained in block 714 for each presented site. Using the audio information, two dominant sites may be detected, and/or more information on interaction between conferees located at different sites may be detected, etc. In some possible embodiments of technique 700, at block 714, the ILC 442 (FIG. 4) may be informed about the current mode of interaction stored in the current-mode register and the current dominant one or more speakers, as it is disclosed above with conjunction with FIG. 6B. The ILC 442 may use this information for defining the layout and the presented conferees to be presented during the next T3.

Management and control information may be obtained in block 715. The management and control information may include preferences of a receiving conferee (the one that will observe the composed CP image), and information of a forced conferee (a conferee that must be presented in the CP image, independent of its audio energy). For each presented conferee image, technique 700 may calculate in block 716 the differences between the current received ROIRL and the previous ROIRL (saved in PRLM memory). Technique 700 may also determine in block 716 if there are differences in the dominant sites.

A decision is made in block 720 whether there is a significant change in the current ROIRL versus the previous ROIRL and/or if there are significant changes in the dominant sites. A significant change may be a pre-defined delta in pixels, percentages, audio strength, etc. In one embodiment, a significant change may be in the range of 5-10%. If in block 720 there is a significant change, then technique 700 may store in block 722 the current ROIRL and dominant sites in the PRLM. Technique 700 may then proceed to block 750 in FIG. 7B. If in block 720 there is no significant change then technique 700 may return to block 706. Yet, in cases wherein indication on changes in the mode of interaction is reported from block 684 of technique 600B (FIG. 6B), then method 700 may proceed to block 722.

Referring now to FIG. 7B, in block 750, a loop may be started in blocks 760-790 for each output video module 455A-X that executes the same layout that is designed by technique 700. Beginning in block 760, for each output module 455A-X, technique 700 may fetch in block 762 information on parameters related to the CP layout associated with the current output video module. The parameters in one embodiment may include the layout size in number of pixels, the layout format (2×2, 3×3, etc.), the sites that have been selected to be presented based on management decision and/or audio energy, etc. Technique 700 may also reset in block 762 a counter (Cnt) that will count the number of trials.

Next, technique 700 may get in block 764 the ROIRL (ROI relative location) information and parameters for each of the sites that were selected to be presented in the adaptive layout of the relevant output video module 455A-X. The information may be fetched from the PRLM in one embodiment. In one embodiment, the parameters may include the height and width of the ROI, the relative location of the ROI, the dominant sites, the interaction between the sites, etc. Using the fetched information, technique 700 may determine in block 770 if there is a pair of dominant sites. If there is no pair of dominant sites, then technique 700 may proceed to block 774. If there is a pair of dominant sites then technique 700 may proceed to block 772.

In block 772, the dominant sites may be placed in the upper row of segments in the layout that may be presented in one embodiment. In alternate embodiments, they may be placed in the lower row, or elsewhere as desired. A dominant video image with an ROIRL on the left side may be placed in block 772 in a left segment of the layout. The dominant video image with an ROIRL on the right side of the video image may be placed in a right segment of the layout in block 772. If video images of both dominant sites have the same ROIRL (either both are left or both are right), then the video image of one of the dominant sites may be mirrored in block 772. If both dominant sites have images at the center, then they may be placed side by side.

Other sites that have been selected to be presented may be placed in block 774 such that video images with an ROIRL on the right side may be placed on a right segment, video images with an ROIRL on the left side may be placed on a left segment, and video images with an ROIRL in the center may be placed in a center segment or in a remaining segment, etc. If there are one or more selected sites that cannot be placed in the remaining segments, technique 700 may mirror the video images in block 774 and place them accordingly. Next, counter (Cnt) may be incremented by one in block 776.

At block 780 a decision may be made whether the Cnt value equals 2 or if the procedure of block 774 has completed successfully, so that all selected conferees may be presented in an appropriate relative location of the layout. If these conditions are not met, technique 700 may ignore in block 782 the dominant sites placement that were determined in block 772, and may retry placing all of the selected sites in block 774. If in block 780 the Cnt value equals 2 or if the procedure of block 774 has completed successfully, technique 700 may proceed to block 784.

In block 784, a decision may be made whether the procedure of block 774 has completed successfully. In one embodiment, "successfully" may mean that all sites that were selected for viewing were placed such that they are all facing the center of the layout. If the conditions of block 784 are not met, technique 700 may ignore in block 786 the identified interaction, select a common layout that fits the number of sites to be displayed, and arrange the layout ignoring the ROIRL. If block 784 determines that the procedure of block 774 has completed successfully, technique 700 may create in block 788 instructions regarding the layout arrangement, so that the presented sites are looking to the center of the layout. The layout instructions, including mirroring if needed, may be sent in block 788 to the editor module 456 in the appropriate output video module 455A-X.

In another embodiment, in block 786 the technique 700 may select one of the calculated layouts, which may present some interaction between conferees.

Next, the technique 700 may check in block 790 whether there are additional video output modules 455A-X that need to be instructed on their layout arrangement. If there are, then technique 700 may return to block 760. If there are not, then technique 700 may return to block 706 in FIG. 7A.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser. The scope of the invention is limited only by the following claims and equivalents thereof.

While certain embodiments have been described in details and shown in the accompanying drawings, it is to be understood that such embodiments are merely illustrative of and not devised without departing from the basic scope thereof, which is determined by the claims that follow.

The invention claimed is:

1. A non-transitory computer readable medium containing executable instructions comprising instruction when executed cause a programmable device to:
   determine automatically an interaction between a first conferee and a second conferee of a plurality of conferees of a continuous presence videoconference;
   employ a layout for a continuous presence video image for a first endpoint responsive to the interaction between the first conferee and the second conferee;
   assign a first video image corresponding to the first conferee to a first segment of the layout; and
   assign a second video image corresponding to the second conferee to a second segment of the layout relative to the first video image in the continuous presence video image, responsive to the interaction between the first conferee and the second conferee; and
   compose the continuous presence video image responsive to information related to the layout and the assignment of the first video image and the assignment of the second video image by an editor for presentation by the first endpoint.

2. The computer readable medium of claim 1, wherein the editor is located at a multipoint control unit.

3. The computer readable medium of claim 1, wherein the instructions further comprise instructions that when executed cause the programmable device to design the layout responsive to the determined interaction between the first conferee and the second conferee.

4. The computer readable medium of claim 3, wherein the instructions that when executed cause the programmable device to design the layout comprise instructions that when executed cause the programmable device to:
   receive content from an endpoint corresponding to the first conferee; and
   present the content in the continuous presence video image,
   wherein the first segment and the second segment of the layout are adjacent to the content in the layout.

5. The computer readable medium of claim 4, wherein the instructions further comprise instructions that when executed cause the programmable device to:
   process the first video image and the second video image to present the first conferee and the second conferee looking toward the content.

6. The computer readable medium of claim 1, wherein the instructions that when executed cause the programmable device to compose the continuous presence video image comprise instructions than when executed cause the programmable device to:
   generate instructions for the first endpoint for creating the continuous presence video image at the first endpoint responsive to the interaction between the first conferee and the second conferee;
   send the instructions to the first endpoint; and
   create the continuous presence video image at the first endpoint responsive to the instructions.

7. The computer readable medium of claim 1, wherein the instructions that when executed cause the programmable device to compose the continuous presence video image comprise instructions than when executed cause the programmable device to:
   create, by the editor, a continuous presence video image for the first endpoint responsive to the interaction between the first conferee and the second conferee; and
   send the continuous presence video image to the first endpoint.

8. The computer readable medium of claim 1, wherein the instructions further comprise instructions that when executed cause the programmable device to:
   employ a second layout for a continuous presence video image for a second endpoint of the continuous presence videoconference automatically responsive to the interaction between the first conferee and the second conferee, the continuous presence video image for the second endpoint different from the continuous presence video image for the first endpoint; and
   display the continuous presence video image for the second endpoint at the second endpoint according to the second layout.

9. The computer readable medium of claim 1, wherein the instructions that when executed cause the programmable device to determine automatically an interaction between a first conferee and a second conferee of the plurality of conferees comprise instructions that when executed cause the programmable device to:
   obtain, during a period of time, information related to audio energy obtained from each of a plurality of endpoints participating in the continuous presence videoconference; and
   calculate, at the end of the period, a contribution of each endpoint of the plurality of endpoints to a total audio energy indication for the period.

10. The computer readable medium of claim 9, wherein the instructions that when executed cause the programmable device to determine automatically an interaction between a first conferee and a second conferee of the plurality of conferees further comprise instructions that when executed cause the programmable device to:
    define the interaction between the first conferee and the second conferee during the period as a first type of interaction responsive to the first and the second conferee each contributing a portion of the total audio energy indication within a predefined range; and
    define the interaction between the first conferee and the second conferee during the period as a second type of interaction responsive to the first and the second conferee each contributing a portion of the total audio energy indication less than a predefined threshold.

11. A non-transitory computer readable medium containing executable instructions comprising instructions that when executed cause a programmable device to:
   obtain periodically an activity indication that is related to the activity of each conferee of a plurality of conferees during a first period of time;
   store the activity indication of each conferee;
   determine a current mode of interaction by periodically analyzing the stored activity indications that were stored during a second period of time;
   store the current mode of interaction;
   determine a recommendation whether to adapt a layout for a continuous presence video image, to be used for a next third period of time to reflect the current mode of interaction by periodically analyzing the current mode of interaction stored during a current third period of time; and
   transfer the recommendation to an editor processor that is configured to compose the continuous presence video image according to the layout.

12. The computer readable medium of claim 11, wherein the first period is related to an audio frame rate used by an endpoint associated with one of the conferees.

13. The computer readable medium of claim 11, wherein the second period is an integer multiple of the first period.

14. The computer readable medium of claim 11, wherein the third period is an integer multiple of the second period.

15. The computer readable medium of claim 11, wherein the duration of the third period is equal to the duration of the second period.

16. The computer readable medium of claim 11, wherein the activity indication of each conferee reflects audio energy obtained from an endpoint that is associated with that conferee.

17. The computer readable medium of claim 11, wherein the instructions that when executed cause the programmable device to determine a current mode of interaction comprise instructions that when executed cause the programmable device to:
   calculate a periodic activity indication of each conferee that reflects activity of that conferee during the second period of time; and
   compare the periodic activity indication of each conferee.

18. The computer readable medium of claim 17, wherein the instructions that when executed cause the programmable device to determine a current mode of interaction further comprise instructions that when executed cause the programmable device to:
   determine that the current mode of interaction is a first mode of interaction between a first conferee and a second conferee when the periodic activity indications of the first and the second conferees are substantially higher than the periodic activity indications of every other conferee.

19. The computer readable medium of claim 18, wherein the layout that reflects the first mode of interaction comprises a plurality of segments wherein two of the plurality of segments are larger than the others.

20. The computer readable medium of claim 17, wherein the instructions that when executed cause the programmable device to determine a current mode of interaction further comprise instructions that when executed cause the programmable device to:
   determine that the current mode of interaction is a second type of interaction when the periodic activity indications of the plurality of conferees are substantially similar to each other.

21. The computer readable medium of claim 20, wherein the layout that reflects the second type of interaction comprises a plurality of substantially similarly sized segments.

22. The computer readable medium of claim 17,
   wherein the activity indication of each conferee reflects audio energy obtained from an endpoint that is associated with that conferee, and
   wherein the periodic activity indication of each conferee is calculated as a ration between a total audio energy of that conferee and a total audio energy of all of the plurality of conferees during the second period of time.

23. The computer readable medium of claim 17,
   wherein the activity indication of each conferee reflects audio energy obtained from an endpoint that is associated with that conferee; and
   wherein the periodic activity indication of each conferee is calculated responsive to how often the audio energy of that conferee was the highest audio energy of all conferees during the second period of time.

24. A method for defining a layout for a continuous presence video image automatically for a first endpoint of a continuous presence videoconference responsive to an interaction between a plurality of conferees, comprising:
   determining an interaction between two or more conferees of a plurality of conferees of a continuous presence videoconference;
   creating a layout for a continuous presence video image for a first endpoint responsive to the interaction between the two or more conferees, wherein the layout comprises a plurality of segments;
   generating a plurality of video images, wherein a video image of the plurality of video images corresponds to each of the two or more conferees;
   assigning an video image of the plurality of video images to a segment of the plurality of segments of the layout, wherein the assignment of the video image is responsive to the interaction between the two or more conferees; and
   generating the continuous presence video image responsive to information related to the layout and the assignment of the video image by an editor for presentation by the first endpoint.

25. A method for automatically determining a mode of interaction between two or more conferees of a plurality of conferees in a continuous presence videoconference, comprising:
   determining the activity of each conferee of a plurality of conferees during a first period of time;
   generating an activity indication that is related to the activity of each conferee;
   selecting a current mode of interaction by periodically analyzing the generated activity indications that were generated during a second period of time;
   determining a recommendation whether to adapt a layout for a continuous presence video image, to be used for a next third period of time to reflect the current mode of interaction by periodically analyzing the current mode of interaction selected during a current third period of time; and
   conveying the recommendation to an editor processor that is configured to compose the continuous presence video image according to the layout.

26. A system for adapting a continuous presence layout for a discussion situation, comprising:
- a multipoint control unit (MCU), configured to:
  - monitor activity of each conferees of a plurality of conferees of a continuous presence videoconference;
  - determine a plurality of video images to display in a continuous presence video image;
  - obtain information regarding a region of interest for each video image of the plurality of video images;
  - modify a continuous presence layout according to the information regarding the region of interest of the video image and according to the activity of the plurality of conferees; and
  - generate instructions for creating the continuous presence video image based on the continuous presence layout; and
- a plurality of endpoints, wherein each endpoint of the plurality of endpoints is configured to:
  - capture the activity of the plurality of conferees; and
  - construct the continuous presence video image responsive to information related to the layout.

27. The system of claim 26, wherein the region of interest is based on the activity of the plurality of conferees.

28. The system of claim 26, wherein information regarding the region of interest of the video image comprises a relative location of the region of interest in the video image and a size of the region of interest in the video image.

29. A multipoint control unit (MCU) for adapting a continuous presence layout for a discussion situation comprising:
- a control module (CM), configured to:
  - monitor the activity of each conferees of a plurality of conferees;
  - determine a plurality of video images to display in a continuous presence video image;
  - obtain information regarding a region of interest for each video image of the plurality of video images, wherein the region of interest is based on the activity of the plurality of conferees;
  - modify a continuous presence layout according to the information regarding the region of interest of the video image and according to the activity of the plurality of conferees; and
  - generate instructions for creating a continuous presence video image based on the continuous presence layout.

* * * * *